US011683539B2

(12) United States Patent
Toma et al.

(10) Patent No.: US 11,683,539 B2
(45) Date of Patent: Jun. 20, 2023

(54) VIDEO TRANSMISSION METHOD, VIDEO RECEPTION METHOD, VIDEO TRANSMISSION APPARATUS, AND VIDEO RECEPTION APPARATUS

(71) Applicant: Panasonic Intellectual Property Management Co., Ltd., Osaka (JP)

(72) Inventors: Tadamasa Toma, Osaka (JP); Takahiro Nishi, Nara (JP); Noritaka Iguchi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/536,359

(22) Filed: Nov. 29, 2021

(65) Prior Publication Data
US 2022/0086510 A1 Mar. 17, 2022

Related U.S. Application Data

(63) Continuation of application No. 16/841,910, filed on Apr. 7, 2020, now Pat. No. 11,218,742, which is a (Continued)

(30) Foreign Application Priority Data

May 20, 2016 (JP) ................... 2016-101958

(51) Int. Cl.
H04N 21/2343 (2011.01)
H04N 19/30 (2014.01)
(Continued)

(52) U.S. Cl.
CPC ......... H04N 21/2343 (2013.01); G06T 5/007 (2013.01); H04N 19/30 (2014.11);
(Continued)

(58) Field of Classification Search
None
See application file for complete search history.

(56) References Cited

U.S. PATENT DOCUMENTS 10,652,593 B2 * 5/2020 Toma ................. H04N 21/4348
11,218,742 B2 * 1/2022 Toma ...................... G06T 5/007
(Continued)

FOREIGN PATENT DOCUMENTS

JP     H11-146291 A    5/1999
JP     2017-120330 A   7/2017
(Continued)

OTHER PUBLICATIONS

Examination Report dated Sep. 8, 2021 in Indian Patent Application No. 201847012771.
(Continued)

Primary Examiner — Delomia L Gilliard
(74) Attorney, Agent, or Firm — Wenderoth, Lind & Ponack, L.L.P.

(57) ABSTRACT

A video transmission method according to the present disclosure includes: generating a transmission signal including, in a time series, first video data having a first luminance dynamic range and second video data having a second luminance dynamic range wider than the first luminance dynamic range; and transmitting the transmission signal generated. In the generating of the transmission signal, a signal level corresponding to a luminance value is limited to a value lower than a limit value that is predetermined, in a transition period provided for switching from one of the first video data and the second video data to the other.

3 Claims, 22 Drawing Sheets

Related U.S. Application Data continuation of application No. 15/933,799, filed on Mar. 23, 2018, now Pat. No. 10,652,593, which is a continuation of application No. PCT/JP2016/004021, filed on Sep. 2, 2016.

(60) Provisional application No. 62/238,155, filed on Oct. 7, 2015.

(51) Int. Cl.
| | | |
|---|---|---|
| *H04N 19/89* | (2014.01) | |
| *G06T 5/00* | (2006.01) | |
| *H04N 21/234* | (2011.01) | |
| *H04N 21/236* | (2011.01) | |
| *H04N 21/434* | (2011.01) | |
| *H04N 21/4402* | (2011.01) | |
| *H04N 21/485* | (2011.01) | |

(52) U.S. Cl.
CPC ....... *H04N 19/89* (2014.11); *H04N 21/23418* (2013.01); *H04N 21/23614* (2013.01); *H04N 21/4348* (2013.01); *H04N 21/4402* (2013.01); *H04N 21/4854* (2013.01); *G06T 2207/20208* (2013.01)

(56) References Cited

U.S. PATENT DOCUMENTS

| | | |
|---|---|---|
| 2014/0125696 A1 | 5/2014 | Newton |
| 2014/0210847 A1* | 7/2014 | Knibbeler ............... G06T 5/009 345/589 |
| 2015/0042890 A1 | 2/2015 | Messmer |
| 2015/0124124 A1 | 5/2015 | Maeyama |
| 2016/0155470 A1 | 6/2016 | Toma |
| 2016/0261924 A1 | 9/2016 | Hwang et al. |
| 2016/0323609 A1 | 11/2016 | Yoon et al. |
| 2016/0381400 A1 | 12/2016 | Hwang et al. |
| 2017/0019692 A1 | 1/2017 | Hwang et al. |
| 2017/0193638 A1* | 7/2017 | Grundy .................. G06T 5/007 |
| 2017/0214924 A1* | 7/2017 | Su .......................... H04N 19/30 |
| 2017/0272787 A1 | 9/2017 | Yoon et al. |
| 2017/0366794 A1 | 12/2017 | Yahata |
| 2018/0077453 A1* | 3/2018 | Oh ....................... H04N 21/816 |

FOREIGN PATENT DOCUMENTS

| | | | |
|---|---|---|---|
| WO | 2015/093811 A1 | 6/2015 | |
| WO | WO-2015093811 A * | 6/2015 | ........... H04N 21/236 |

OTHER PUBLICATIONS

Extended European Search Report dated Jun. 26, 2018 in European Application No. 16853230.7.

International Search Report dated Dec. 6, 2016 in International (PCT) Application No. PCT/JP2016/004021.

ARIB Standard, ARIB STD-B67 Version 1.0, Jul. 3, 2015.

Tim Borer, "Non-linear Opto-Electrical Transfer Functions for High Dynamic Range Television", BBC Research & Development White Paper, WHP 283, British Broadcasting Corporation, Jul. 2014.

* cited by examiner

```
MPU_Timestamp_Descriptor (){
    descriptor_tag
    descriptor_length
    for (i=0;i<N;i ++) {
        mpu_sequence_number
        mpu_hdr_indicator
        mpu_presentation_time
    }
}
```

FIG. 12

```
MPU_Extended_Timestamp_Descriptor(){
  descriptor_tag
  descriptor_length
  reserved
  pts_offset_type
  timescale_flag
  if(timescale_flag == 1){
    timescale
  }
  if (pts_offset_type == 1){
    default_pts_offset
  }
  for (i=0; i<N; i++){
    mpu_sequence_number
    mpu_hdr_indicator
    mpu_decoding_time_offset
    num_of_au
    for (j=0; j<num_of_au; j++){
      dts_pts_offset
      if (pts_offset_type == 2){
        pts_offset
      }
    }
  }
}
```
— 301

FIG. 13

```
VIDEO COMPONENT DESCRIPTOR (){
    descriptor_tag
    descriptor_length
    video_resolution
    ...
    current_EOTF
    EOTF_update_flag
    if (EOTF_update_flag == 1){
        new_EOTF
        new_EOTF_start_mpu_sequence_number
    }
}
```

VIDEO TRANSMISSION METHOD, VIDEO RECEPTION METHOD, VIDEO TRANSMISSION APPARATUS, AND VIDEO RECEPTION APPARATUS

CROSS REFERENCE TO RELATED APPLICATIONS

This application is a U.S. continuation application of PCT International Patent Application Number PCT/JP2016/004021 filed on Sep. 2, 2016, claiming the benefit of priority of U.S. Provisional Patent Application No. 62/238,155 filed on Oct. 7, 2015 and Japanese Patent Application Number 2016-101958 filed on May 20, 2016, the entire contents of which are hereby incorporated by reference.

BACKGROUND

1. Technical Field

The present disclosure relates to a video transmission method, a video reception method, a video transmission apparatus, and a video reception apparatus.

2. Description of the Related Art

The high dynamic range (HDR) has been drawing attention as a scheme covering a luminance range with an increased maximum luminance value in order to represent bright light such as mirror-reflected light that cannot be represented using current TV signals, with brightness closer to the actual brightness while maintaining dark part gradation of existing video. Specifically, the scheme covering the luminance range supported by the existing TV signals is called the standard dynamic range (SDR) and has the maximum luminance value of 100 nits. In contrast, the HDR is expected to have an increased maximum luminance value of at least 1000 nits (see ARIB STANDARD ARIB STD-BG7 Version 1.0 Jul. 3, 2015 (Non-Patent Literature (NPL) 1)).

SUMMARY

As for transmission or reception of video signals supporting a plurality of luminance dynamic ranges as described above, there is a demand for easier switching of the luminance dynamic range by a video reception apparatus.

In view of the above, the present disclosure provides a video transmission method, a video reception method, a video transmission apparatus, or a video reception apparatus that enables easier switching of a luminance dynamic range by a video reception apparatus.

A video transmission method according to an aspect of the present disclosure includes: generating a transmission signal including, in a time series, first video data having a first luminance dynamic range and second video data having a second luminance dynamic range wider than the first luminance dynamic range; and transmitting the transmission signal generated. In the generating of the transmission signal, a signal level corresponding to a luminance value is limited to a value lower than a limit value that is predetermined, in a transition period provided for switching from one of the first video data and the second video data to the other.

A video reception method according to an aspect of the present disclosure is a video reception method performed by a video reception apparatus including a display. The video reception method includes receiving a reception signal including, in a time series, first video data having a first luminance dynamic range and second video data having a second luminance dynamic range wider than the first luminance dynamic range. In the reception signal, a signal level corresponding to a luminance value is limited to a value lower than a limit value that is predetermined, in a transition period provided for switching from one of the first video data and the second video data to the other. The reception signal includes first information for notifying, in a first period immediately after a start of the transition period, switching of a luminance dynamic range. The video reception method further includes switching the luminance dynamic range of the display during a switching allowed time that starts when the first information is obtained, the switching allowed time being a length of time allowed for switching the luminance dynamic range.

Note that these general or specific aspects may be implemented by a system, a method, an integrated circuit, a computer program, or a computer-readable recording medium such as a compact disc read only memory (CD-ROM), or by any combination of a system, a method, an integrated circuit, a computer program, and a recording medium.

The present disclosure can provide a video transmission method, a video reception method, a video transmission apparatus, or a video reception apparatus that enables easier switching of a luminance dynamic range by a video reception apparatus.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 12 illustrates an example of an extended timestamp descriptor according to Embodiment 3;

FIG. 13 illustrates an example of a video component descriptor according to Embodiment 3;

Figure 1:
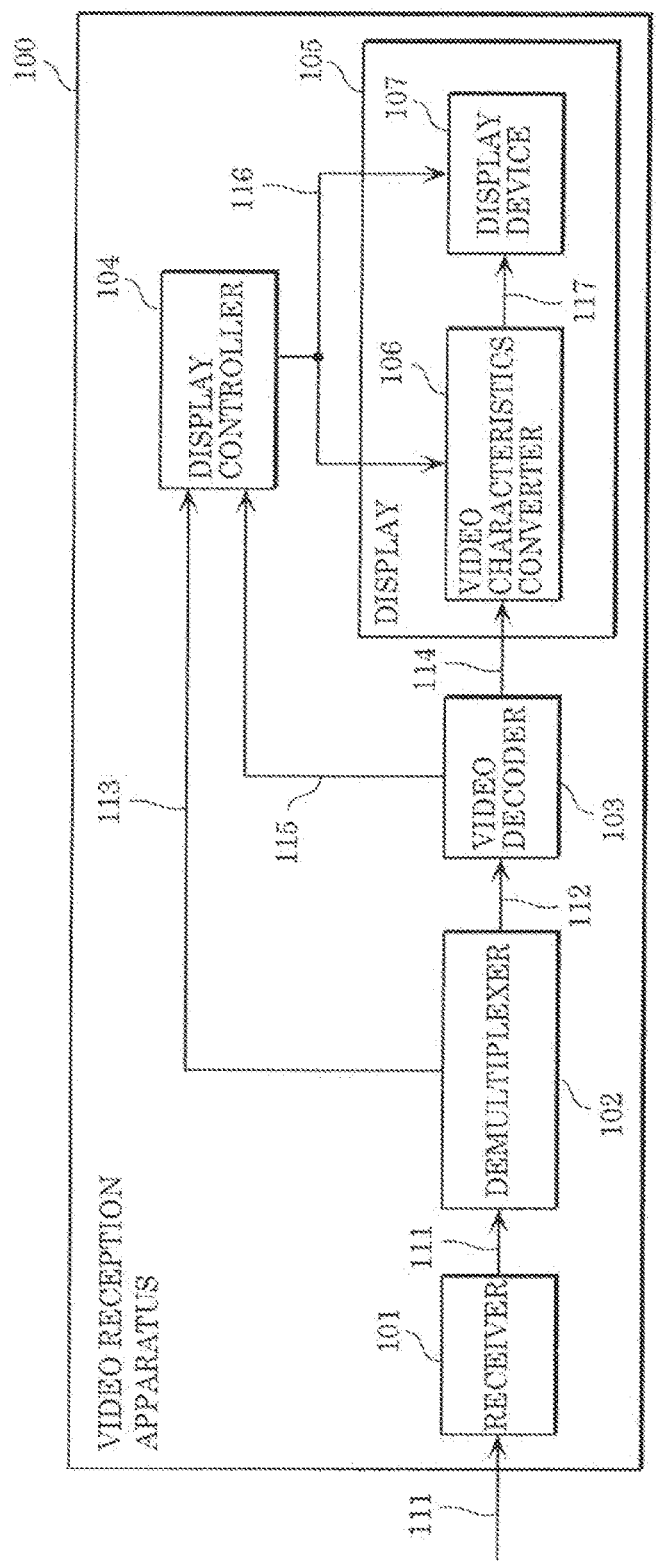
FIG. 1 is a block diagram of a video reception apparatus according to Embodiment 1.

DETAILED DESCRIPTION OF THE EMBODIMENTS (Underlying Knowledge Forming Basis of the Present Disclosure)

According to, for example, a video coding standard known as ITU-T H.265|ISO/IEC 23008-2 HEVC, the optical-electro transfer function (OETF) or electro-optical transfer function (EOTF) of a video signal is notified of using a syntax known as transfer characteristics in video usability information (VUI) included in a sequence parameter set (SPS). Use of the transfer characteristics in the SPS enables notification of switching of transfer characteristics (transfer function) at frame accuracy. A video reception apparatus determines a method of controlling a video display, based on the transfer characteristics.

According to the MPEG-2 transport stream (TS) standard, which is used for transmitting a video signal and an audio signal in a multiplexed manner as in the case of TV broadcast etc., there is a known method of including, in a descriptor of program-specific information (PSI), a parameter included in the aforementioned SPS and information related to the parameter, and transmitting information related to an operation of the video reception apparatus in an upper layer. By using the descriptor of the PSI for the transfer characteristics as well, the video reception apparatus can more easily determine a method of controlling the video display. Since the PSI is generally inserted into a multiplexed stream at a constant cycle, the PSI is not synchronized with frames of a video signal. Note that according to the MPEG-H MPEG media transport (MMT) standard, a structure similar to the PSI is defined as MMT-SI.

The transfer characteristics are defined by, for example, ITU-R BT.2020 (hereinafter, BT.2020), ARIB STD-B67 (hereinafter, STD-B67), and SMPTE ST2084 (hereinafter, ST2084). STD-B67 and ST2084 can handle a video signal having a luminance ten to a hundred times as high as the conventional BT.2020, known as the high dynamic range (HDR). In contrast to the HDR, the dynamic range of the conventional BT.2020 etc., is called the standard dynamic range (SDR).

The TV broadcast compatible with the HDR may include both HDR programs and commercials and SDR programs and commercials. Accordingly, the video reception apparatus needs to operate while switching the control on the display, depending on whether the program/commercial is the HDR or the SDR.

A video transmission method according to an aspect of the present disclosure includes: generating a transmission signal including, in a time series, first video data having a first luminance dynamic range and second video data having a second luminance dynamic range wider than the first luminance dynamic range; and transmitting the transmission signal generated. In the generating of the transmission signal, a signal level corresponding to a luminance value is limited to a value lower than a limit value that is predetermined, in a transition period provided for switching from one of the first video data and the second video data to the other.

With this, the signal level of the video data is limited to a value lower than the limit value in the transition period provided for switching to video data having a different luminance dynamic range. Thus, the video reception apparatus need not change the luminance dynamic range of the display on a per-frame basis, for example, and it is only necessary to change the luminance dynamic range of the display in the transition period. This as a result enables easier switching of the luminance dynamic range by the video reception apparatus.

For example, in the generating of the transmission signal, the signal level corresponding to the luminance value may be limited to the value lower than the limit value in a first transition period provided for switching from the first video data to the second video data.

For example, in the generating of the transmission signal, the signal level corresponding to the luminance value need not be limited to the value lower than the limit value in a second transition period provided for switching from the second video data to the first video data.

For example, the transmission signal may include first information for notifying, in a first period immediately after a start of the transition period, switching of a luminance dynamic range.

For example, the first period may be a period of time from immediately after the start of the transition period to a time preceding a switching time by a switching allowed time, the switching time being a time at which the one of the first video data and the second video data is switched to the other, the switching allowed time being a length of time allowed for the switching of the luminance dynamic range by a video reception apparatus that receives the transmission signal.

For example, in the generating of the transmission signal, a video signal may be generated by coding the first video data and the second video data, and the transmission signal including the first information may be generated by multiplexing the video signal generated and an audio signal.

For example, the transmission signal may include second information indicating the transition period.

A video reception method according to an aspect of the present disclosure is a video reception method performed by a video reception apparatus including a display. The video reception method includes: receiving a reception signal including, in a time series, first video data having a first luminance dynamic range and second video data having a second luminance dynamic range wider than the first luminance dynamic range. In the reception signal, a signal level corresponding to a luminance value is limited to a value lower than a limit value that is predetermined, in a transition period provided for switching from one of the first video data and the second video data to the other. The reception signal includes first information for notifying, in a first period immediately after a start of the transition period, switching of a luminance dynamic range. The video reception method further includes: switching the luminance dynamic range of the display during a switching allowed time that starts when the first information is obtained, the switching allowed time being a length of time allowed for switching the luminance dynamic range.

With this, the signal level of the video data is limited to a value lower than the limit value in the transition period provided for switching to video data having a different luminance dynamic range. Thus, the video reception apparatus need not change the luminance dynamic range of the display on a per-frame basis, for example, and it is only necessary to change the luminance dynamic range of the display in the transition period. This as a result enables easier switching of the luminance dynamic range by the video reception apparatus.

For example, the first period may be a period of time from immediately after the start of the transition period to a time preceding a switching time by the switching allowed time, the switching time being a time at which the one of the first video data and the second video data is switched to the other.

For example, the video reception method may further include: obtaining a video signal and the first information by demultiplexing the reception signal multiplexed from the video signal and an audio signal; and obtaining the first video data and the second video data by decoding the video signal obtained.

For example, the reception signal may include second information indicating the transition period.

A video transmission apparatus according to an aspect of the present disclosure includes: a generator that generates a transmission signal including, in a time series, first video data having a first luminance dynamic range and second video data having a second luminance dynamic range wider than the first luminance dynamic range; and a transmitter that transmits the transmission signal generated. The generator limits a signal level corresponding to a luminance value to a value lower than a limit value that is predetermined, in a transition period provided for switching from one of the first video data and the second video data to the other.

With this, the signal level of the video data is limited to a value lower than the limit value in the transition period provided for switching to video data having a different luminance dynamic range. Thus, the video reception apparatus need not change the luminance dynamic range of the display on a per-frame basis, for example, and it is only necessary to change the luminance dynamic range of the display in the transition period. This as a result enables easier switching of the luminance dynamic range by the video reception apparatus.

A video reception apparatus according to an aspect of the present disclosure is a video reception apparatus including a display. The video reception apparatus includes a receiver that receives a reception signal including, in a time series, first video data having a first luminance dynamic range and second video data having a second luminance dynamic range wider than the first luminance dynamic range. In the reception signal, a signal level corresponding to a luminance value is limited to a value lower than a limit value that is predetermined, in a transition period provided for switching from one of the first video data and the second video data to the other. The reception signal includes first information for notifying, in a first period immediately after a start of the transition period, switching of a luminance dynamic range. The video reception apparatus further includes: a display controller that switches the luminance dynamic range of the display during a switching allowed time that starts when the first information is obtained, the switching allowed time being a length of time allowed for switching the luminance dynamic range.

With this, the signal level of the video data is limited to a value lower than the limit value in the transition period provided for switching to video data having a different luminance dynamic range. Thus, the video reception apparatus need not change the luminance dynamic range of the display on a per-frame basis, for example, and it is only necessary to change the luminance dynamic range of the display in the transition period. This as a result enables easier switching of the luminance dynamic range by the video reception apparatus.

Hereinafter, embodiments will be specifically described with reference to the drawings.

Note that each of the embodiments described below illustrates a specific example of the present disclosure. The numerical values, shapes, materials, structural elements, the arrangement and connection of the structural elements, steps, the processing order of the steps, etc., illustrated in the embodiments below are mere examples, and are therefore not intended to limit the present disclosure. Furthermore, among the structural elements in the following embodiments, structural elements not recited in any one of the independent claims representing the most generic concepts are described as arbitrary structural elements.

Embodiment 1

A video reception apparatus according to the present embodiment controls a luminance dynamic range of a display at frame accuracy, using transfer characteristics information indicating transfer characteristics at frame accuracy. By doing so, the video reception apparatus can display more appropriate video.

First, a configuration of the video reception apparatus according to the present embodiment will be described. FIG. 1 is a block diagram of video reception apparatus 100 according to the present embodiment. Video reception apparatus 100 is a TV, for example, and receives reception signal 111 transmitted via broadcast waves and displays video based on reception signal 111 received. Video reception apparatus 100 includes receiver 101, demultiplexer 102, video decoder 103, display controller 104, and display 105.

Receiver 101 receives reception signal 111. Reception signal 111 is a system stream multiplexed from a video signal and an audio signal.

Demultiplexer 102 generates video signal 112 that is a video stream, by demultiplexing (system decoding) reception signal 111. Furthermore, demultiplexer 102 outputs, as first transfer characteristics information 113, transfer characteristics obtained from, for example, a descriptor included in reception signal 111. That is to say, first transfer characteristics information 113 is included in a multiplexing layer.

Video decoder 103 generates video data 114 by decoding video signal 112. Furthermore, video decoder 103 outputs, as second transfer characteristics information 115, transfer characteristics obtained from the SPS. That is to say, second transfer characteristics information 115 is included in a video coding layer.

Second transfer characteristics information 115 is information for specifying a transfer function (OETF or EOTF) at frame accuracy supporting a luminance dynamic range of video data 114. For example, second transfer characteristics information 115 is information for specifying, at frame accuracy, a first transfer function corresponding to a first luminance dynamic range (SDR) or a second transfer function corresponding to a second luminance dynamic range (HDR) wider than the first luminance dynamic range. That is to say, second transfer characteristics information 115 indicates whether video data 114 is SDR video data or HDR video data. Moreover, when there is more than one method for the HDR, second transfer characteristics information 115 may indicate the method of the HDR. That is to say, second transfer characteristics information 115 indicates the luminance dynamic range of video data 114. For example, second transfer characteristics information 115 indicates one of a plurality of predetermined luminance dynamic ranges.

The SPS is control information included in video signal 112. Here, the control information is provided on a sequence-by-sequence basis (on a plurality of frames-by-a plurality of frames basis).

Display controller 104 generates control information 116 for controlling display 105, according to first transfer characteristics information 113 and second transfer characteristics information 115.

Display 105 displays video data 114 while controlling the luminance dynamic range at frame accuracy according to control information 116 (that is, first transfer characteristics information 113 and second transfer characteristics information 115). Display 105 includes video characteristics converter 106 and display device 107.

Video characteristics converter 106 generates input signal 117 by converting video data 114 according to control information 116. Specifically, video characteristics converter 106 converts video data 114 into input signal 117 using a transfer function indicated in first transfer characteristics information 113 or second transfer characteristics information 116.

Display device 107 is, for example, a liquid crystal panel, and changes the luminance dynamic range of video displayed, according to control information 116. For example, when display device 107 is a liquid crystal panel, display device 107 changes the maximum luminance of a backlight.

Next, an operation of video reception apparatus 100 will be described. Note that although FIG. 1 illustrates a configuration in which both first transfer characteristics information 113 and second transfer characteristics information 115 are used, it is only necessary that at least second transfer characteristics information 115 is used. Hereinafter, control performed using second transfer characteristics information 115 will be described in detail.

Figure 2:
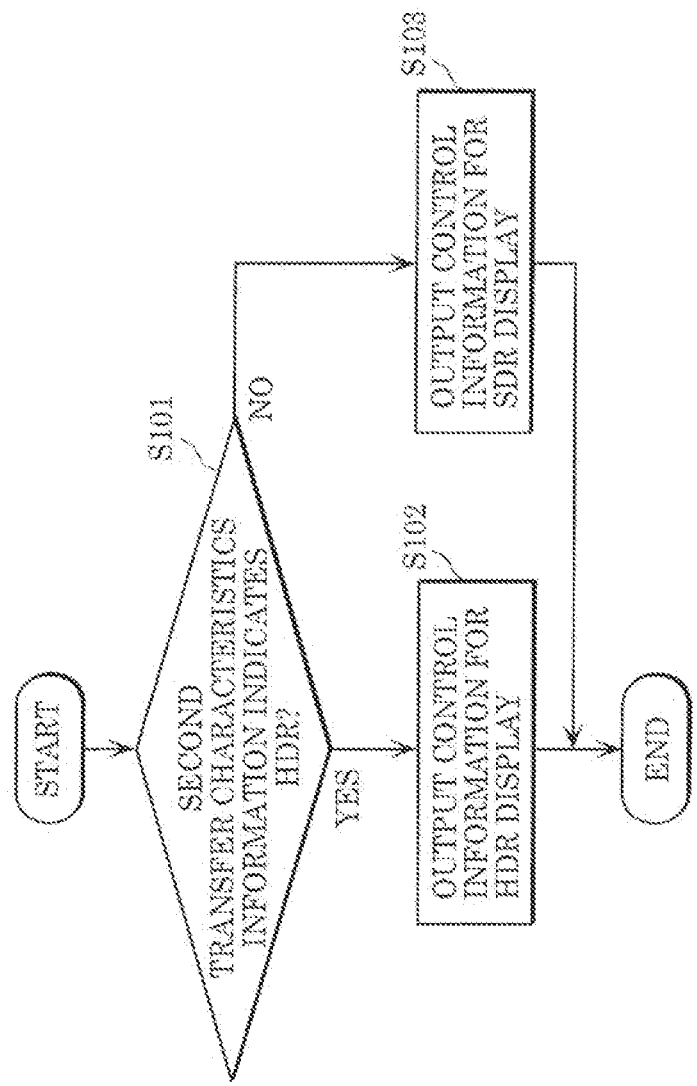
FIG. 2 is a flow chart of processing performed by a display controller according to Embodiment 1.

FIG. 2 is a flow chart of display control processing performed by display controller 104. Note that the processing illustrated in FIG. 2 is performed on a frame-by-frame basis or every time second transfer characteristics information 115 is changed.

First, display controller 104 determines which one of the SDR and the HDR is indicated by second transfer characteristics information 115 (S101).

When the HDR is indicated by second transfer characteristics information 115 (YES in S101), display controller 104 outputs control information 116 for HDR display (S102). With this, display 105 displays video in a luminance dynamic range corresponding to the HDR.

On the other hand, when the SDR is indicated by second transfer characteristics information 115 (NO in S101), display controller 104 outputs control information 116 for SDR display (S103). With this, display 105 displays video in a luminance dynamic range corresponding to the SDR.

In such a manner, by switching control information 116 according to second transfer characteristics information 115 notified of at frame accuracy, it is possible to synchronize the switching of the transfer characteristics and the control on display 105.

Note that when there are a plurality of HDR methods (for example, STD-B67 and ST2084), control information 116 for HDR display may include identification information identifying an HDR method. This allows display 105 to display video in a luminance dynamic range of the corresponding method.

Figure 3:
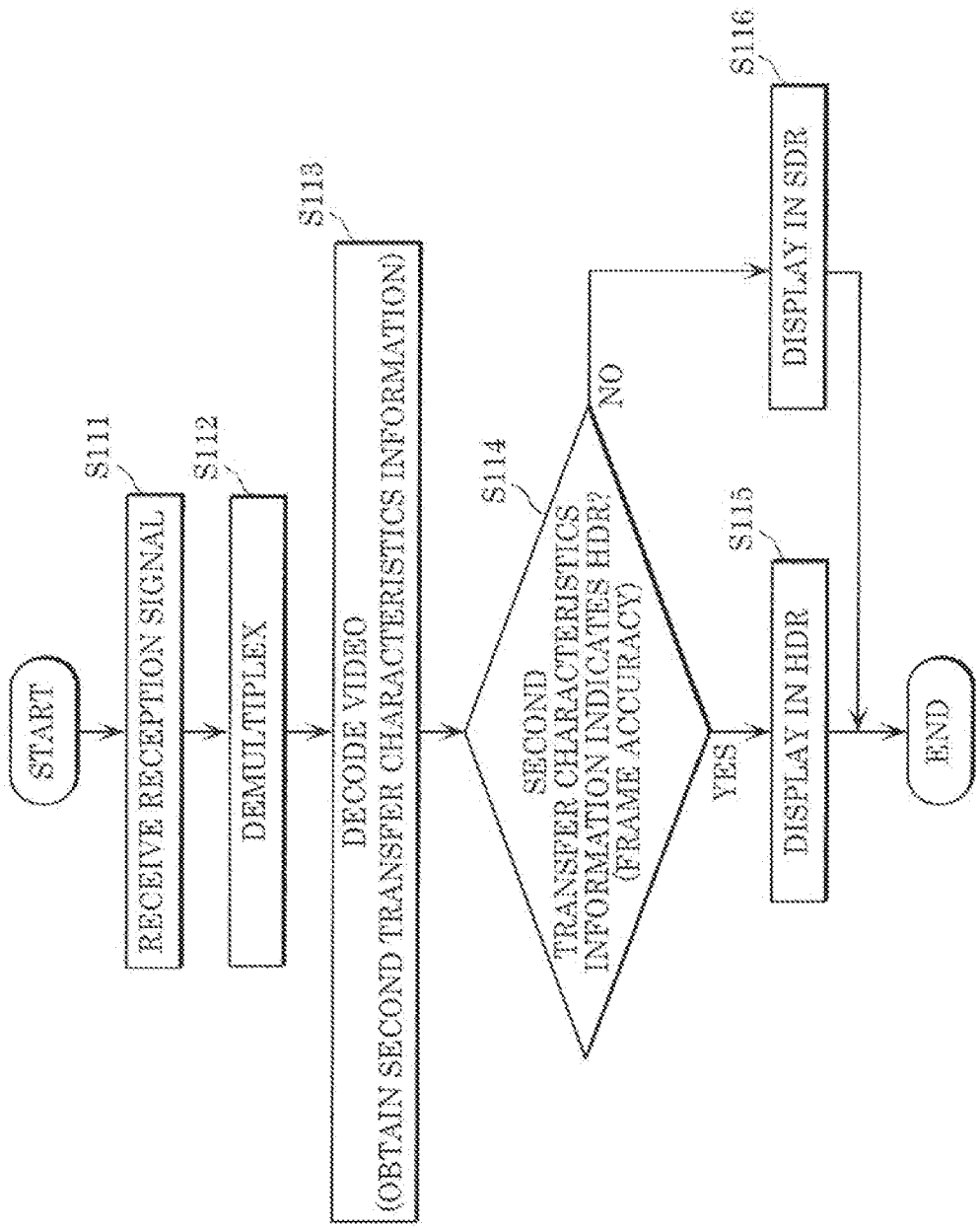
FIG. 3 is a flow chart of video reception processing according to Embodiment 1.

FIG. 3 is a flow chart of video reception processing performed by video reception apparatus 100. First, receiver 101 receives reception signal 111 (S111). Next, demultiplexer 102 generates video signal 112 by demultiplexing reception signal 111 (S112). Next, video decoder 103 generates video data 114 and obtains second transfer characteristics information 115 by decoding video signal 112 (S113).

Next, display controller 104 controls the luminance dynamic range of display 105 according to second transfer characteristics information 115. Specifically, display controller 104 determines, for each frame, at frame accuracy, whether the frame is an HDR frame or an SDR frame, based on second transfer characteristics information 115 (S114). When the frame is an HDR frame (YES in S114), display 105 displays video in the luminance dynamic range of the HDR (S115). When the frame is an SDR frame (NO in S114), display 105 displays video in the luminance dynamic range of the SDR (S116).

Figure 4:
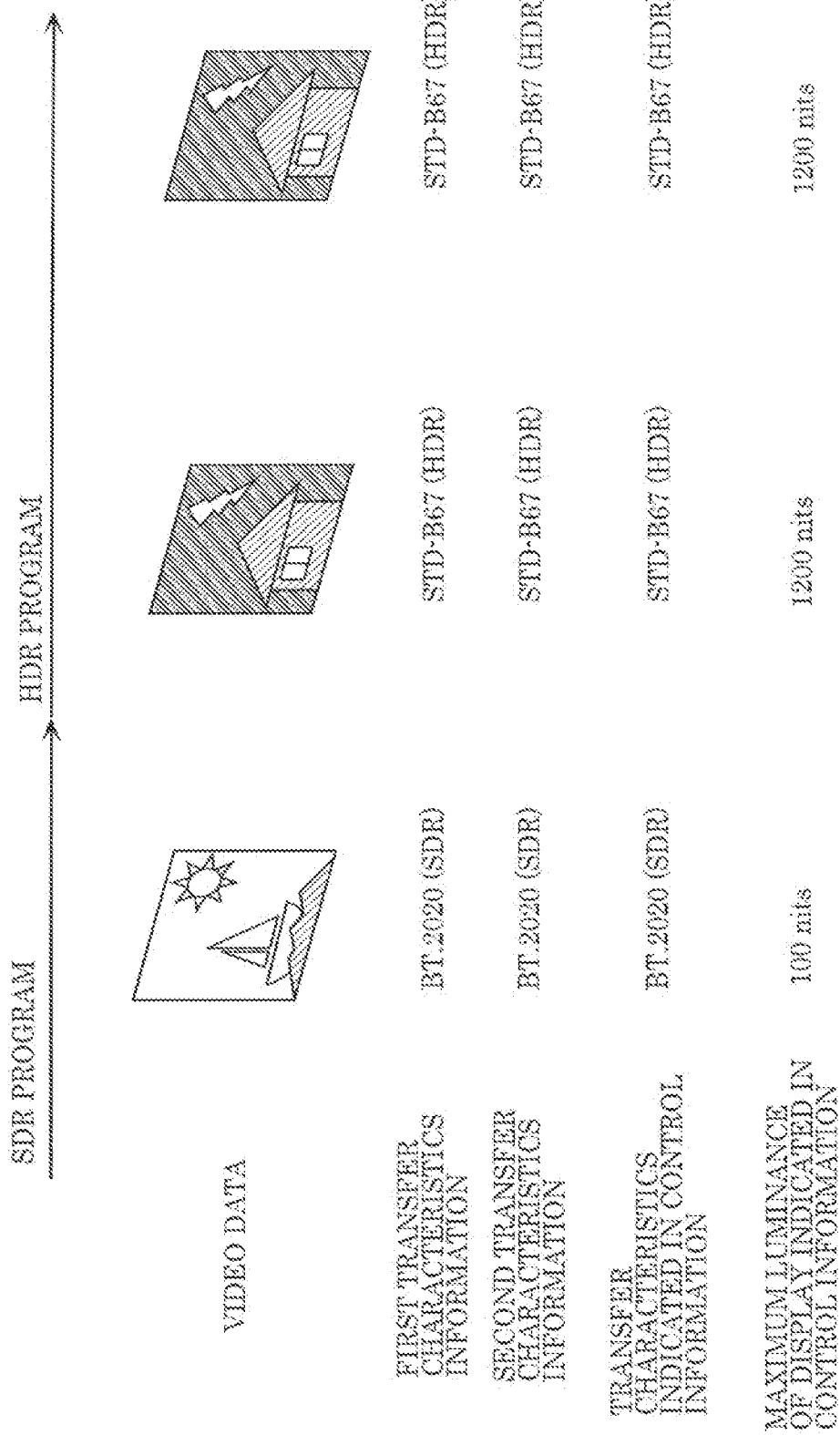
FIG. 4 illustrates an operation performed when there is a change in transfer characteristics according to Embodiment 1.
Figure 5:
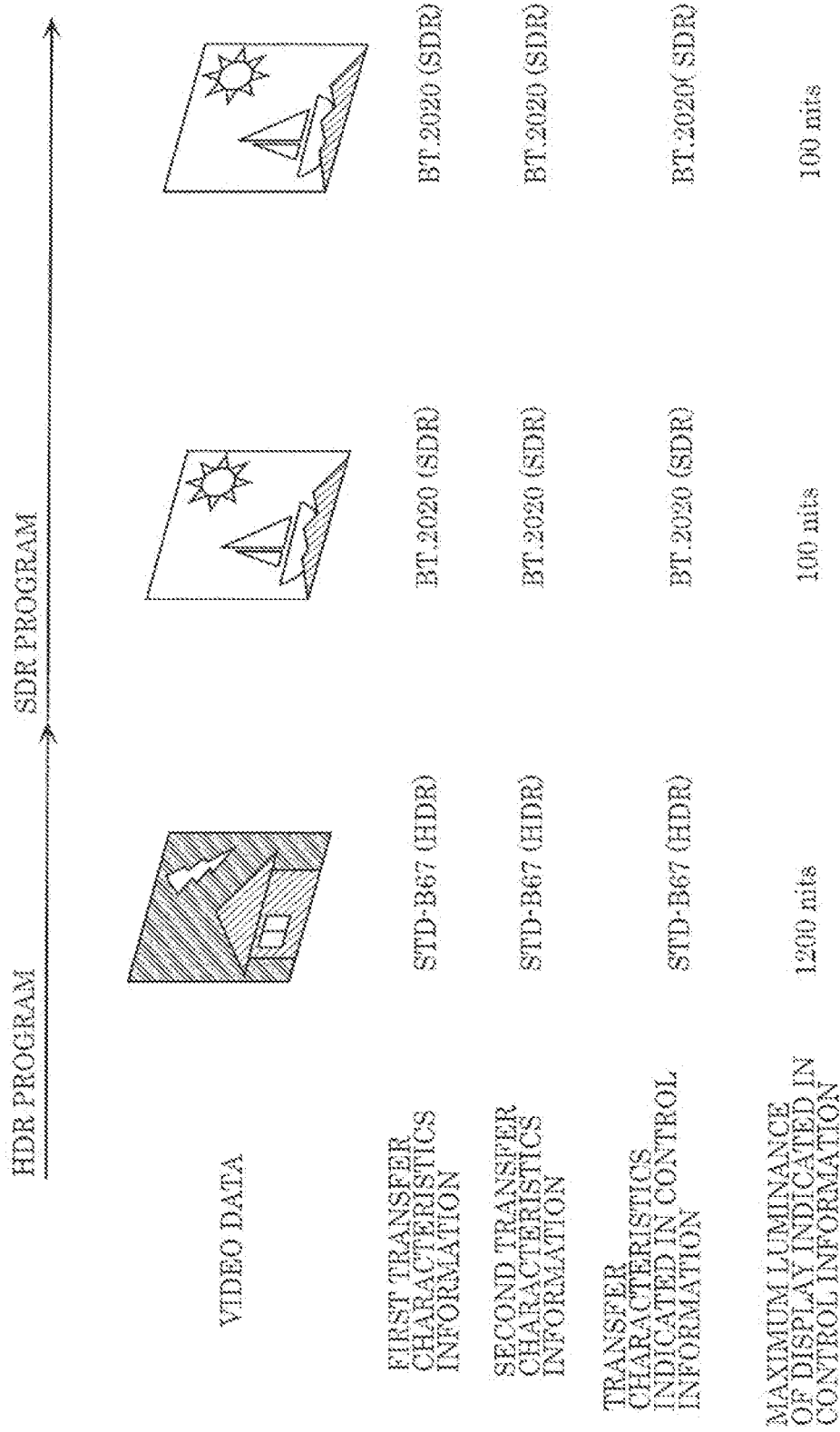
FIG. 5 illustrates an operation performed when there is a change in transfer characteristics according to Embodiment 1.

FIG. 4 illustrates switching from an SDR program to an HDR program. FIG. 5 illustrates switching from an HDR program to an SDR program. As illustrated in FIG. 4 and FIG. 5, the above processing enables appropriate switching between the SDR and the HDR at frame accuracy.

Figure 6:
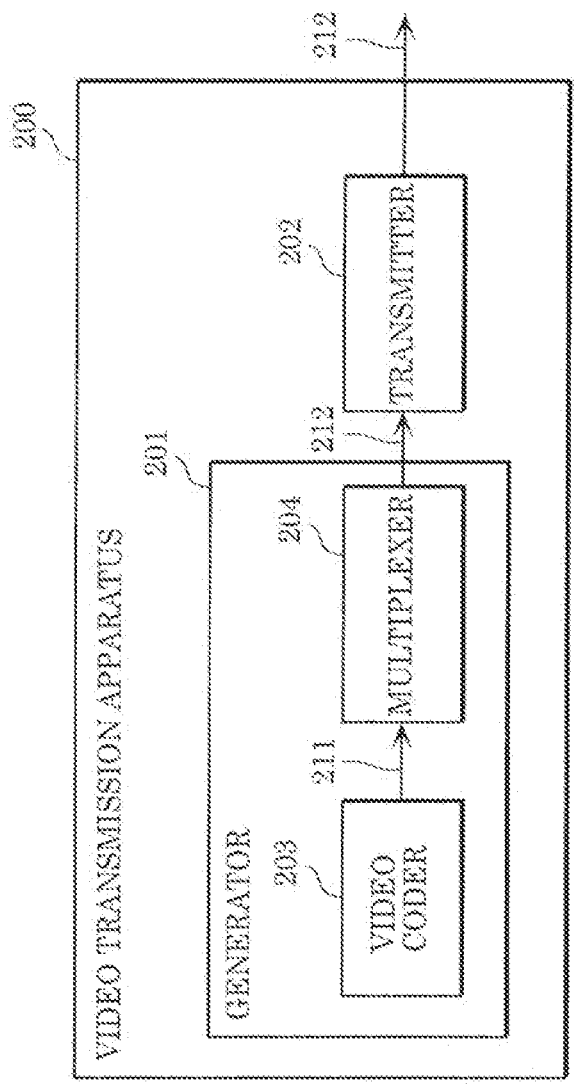
FIG. 6 is a block diagram of a video transmission apparatus according to Embodiment 1.

Hereinafter, video transmission apparatus 200 that generates transmission signal 212 corresponding to aforementioned reception signal 111 will be described. FIG. 6 is a block diagram of video transmission apparatus 200 according to the present embodiment. Video transmission apparatus 200 illustrated in FIG. 6 includes generator 201 and transmitter 202.

Generator 201 generates transmission signal 212 including video data and second transfer characteristics information that is information for specifying, at frame accuracy, a transfer function corresponding to the luminance dynamic range of the video data. Generator 201 includes video coder 203 and multiplexer 204.

Figure 7:
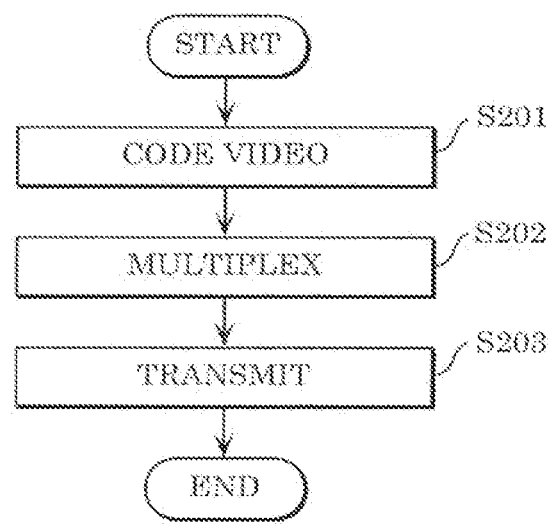
FIG. 7 illustrates a flow chart of video transmission processing according to Embodiment 1.

FIG. 7 is a flow chart of video transmission processing performed by video transmission apparatus 200. First, video coder 203 generates video signal 211 by coding video data and second transfer characteristics information (S201). The second transfer characteristics information corresponds to second transfer characteristics information 115 described above, and is information for specifying, at frame accuracy, the first transfer function corresponding to the first luminance dynamic range (for example, the SDR) or the second transfer function corresponding to the second luminance dynamic range (for example, the HDR) wider than the first luminance dynamic range. The second transfer characteristics information is stored in the SPS included in video signal 211.

Next, multiplexer 204 generates transmission signal 212 by multiplexing coded video signal 211 and an audio signal (S202). Next, transmitter 202 transmits transmission signal 212 generated (S203).

With the above processing, video transmission apparatus 200 generates transmission signal 212 including the second transfer characteristics information for specifying a transfer function at frame accuracy. With this, the video reception apparatus that receives transmission signal 212 can control the luminance dynamic range of the display at frame accuracy, and thus can display more appropriate video.

Embodiment 2

Figure 8:
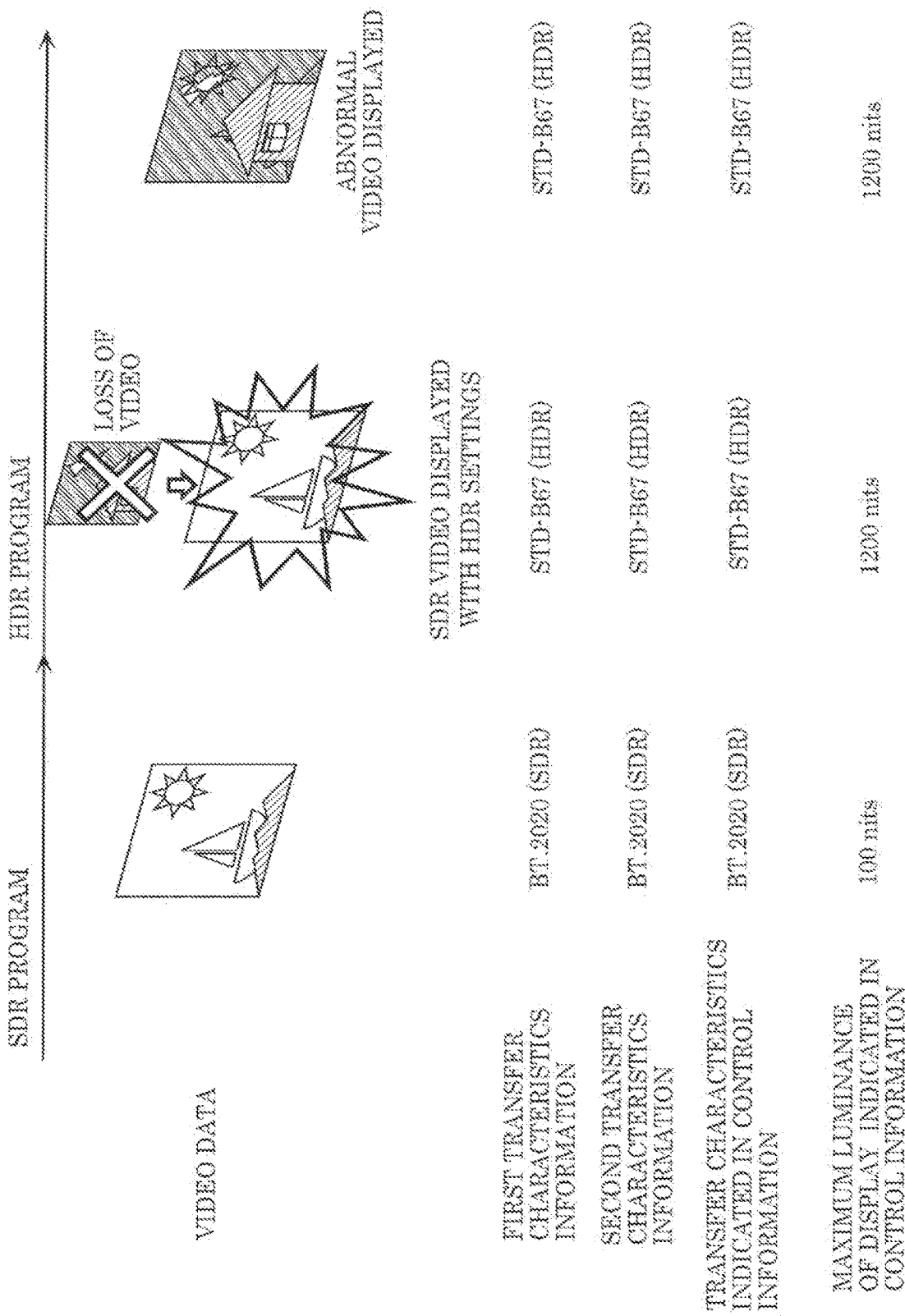
FIG. 8 illustrates an abnormal operation performed when there is a change in transfer characteristics according to Embodiment 2.

With the TV broadcast, an error may occur due to the radio wave condition of terrestrial waves, a satellite, etc. FIG. 8 illustrates the case of a reception error caused by radio disturbance, for example. FIG. 8 illustrates the case where, when switching from the SDR to the HDR, radio disturbance or the like occurs after the video reception apparatus obtains second transfer characteristics information 115 included in the SPS, and, as a result, a loss of a video stream occurs, causing inability to obtain the initial frame of the HDR program. In this case, video decoder 103 continues to display an immediately preceding frame for error concealment. In other words, the frame of the SDR program is repeatedly displayed.

In this case, a subsequent frame refers to this frame, and thus abnormal video mixed with video of a past program is displayed as subsequent video.

Moreover, immediately after the switching from the SDR to the HDR, the luminance dynamic range of the display is set to the HDR, causing the frame of the SDR program to be displayed in the luminance dynamic range of the HDR. This results in a problem of displaying video having a luminance higher than intended.

Figure 9:
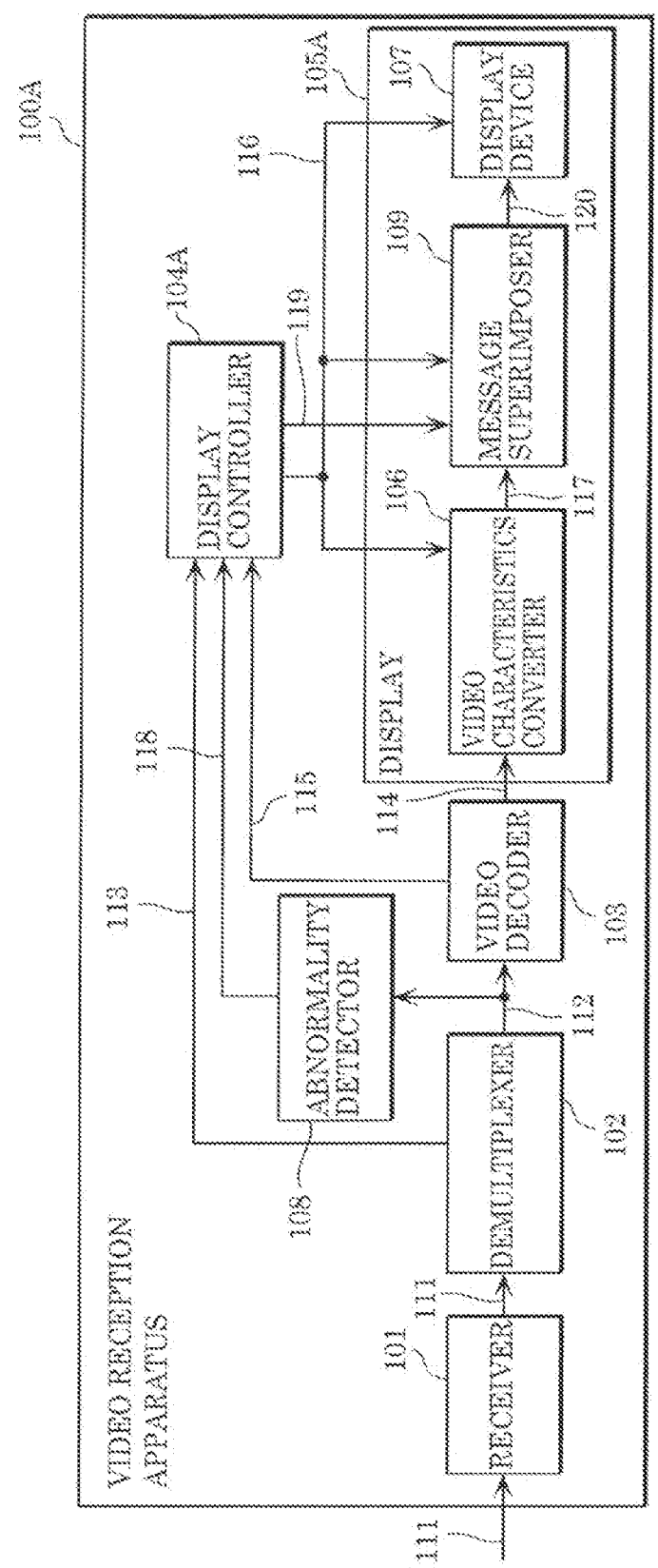
FIG. 9 is a block diagram of a video reception apparatus according to Embodiment 2.

The present embodiment describes a video reception apparatus that addresses this problem. FIG. 9 is a block diagram of video reception apparatus 100A according to the present embodiment. Video reception apparatus 100A illustrated in FIG. 9 includes, in addition to the elements included in video reception apparatus 100 illustrated in FIG. 1, abnormality detector 108 and message superimposer 109 included in display 105A. Moreover, display controller 104A has an additional function.

Abnormality detector 108 determines whether video data 114 (video signal 112) is correctly obtained. Specifically, abnormality detector 108 detects a packet loss based on the sequence number of each packet, and obtains the starting position of frame data by analyzing the payload of each packet, so as to determine whether all the frame data is obtained (normal) or only a part of the frame data is obtained (abnormal). Furthermore, abnormality detector 108 outputs abnormality notifying information 118 indicating the determination result to display controller 104A. That is to say, display controller 104A is notified that an abnormal condition has occurred, or is notified of information for specifying an abnormal frame.

Display controller 104A generates control information 116 and message 119 according to abnormality notifying information 118 in addition to first transfer characteristics information 113 and second transfer characteristics information 115. Specifically, when there is an abnormality, display controller 104A generates message 119 indicating that there is an abnormality, and generates control information 116 for SDR display.

Message superimposer 109 generates input signal 120 by superimposing message 119 on video data (input signal 117) according to control information 116 and message 119, and outputs generated input signal 120 to display device 107. With this, a message such as "Error has occurred" is displayed on display device 107, notifying the viewer that it is not a failure of the apparatus.

Figure 10:
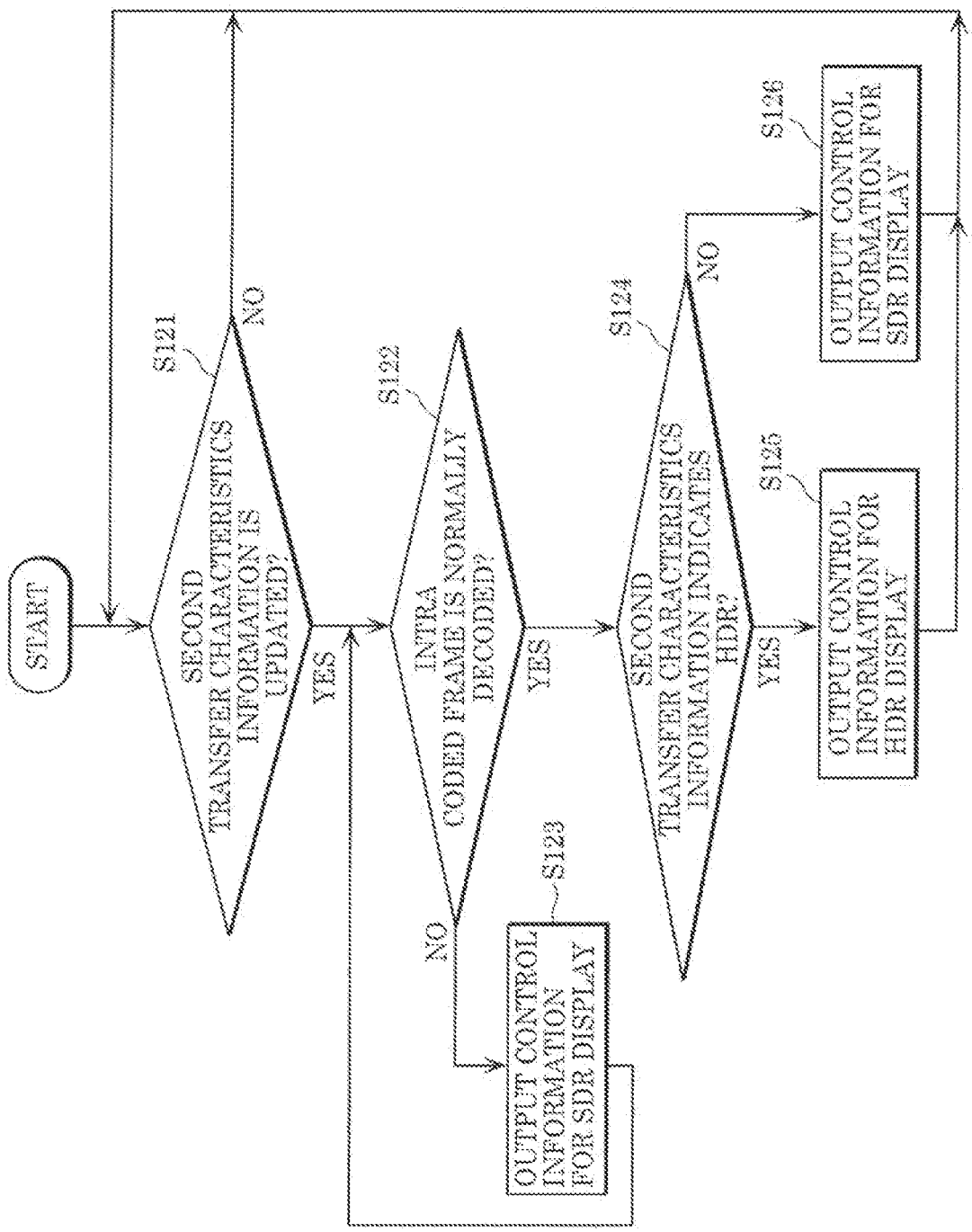
FIG. 10 is a flow chart of processing performed by a display controller according to Embodiment 2.

FIG. 10 is a flow chart of display control processing performed by display controller 104A. First, display controller 104A determines whether second transfer characteristics information 115 is updated (S121). When second transfer characteristics information 115 is updated (YES in S121), display controller 104A starts determination regarding the switching of the display control.

First, display controller 104A determines whether video data is correctly obtained. Specifically, display controller 104A determines whether an intra coded frame is normally decoded, based on abnormality notifying information 118 (S122). When the intra coded frame is not normally decoded (NO in S122), display controller 104A outputs control information 116 for SDR display (S123). With this, display 105 displays video in a luminance dynamic range corresponding to the SDR. That is to say, when determining that the video data is not correctly obtained, display controller 104A sets the SDR (the first luminance dynamic range) as the luminance dynamic range of display 105.

If an error occurs when switching from one luminance dynamic range to another, a frame displayed may include pixels of a frame displayed before the switch. In contrast, according to the present embodiment, in such a case, setting the display control for SDR display as the display control makes it possible to inhibit a frame of the SDR program from being displayed with the HDR high luminance settings.

When an intra coded frame that guarantees interrupt playback, such as IDR or CRA of HEVC, is normally decoded (YES in S122), the display control is switched in the same manner as in Embodiment 1. That is to say, display controller 104A determines which one of the SDR and the HDR is indicated by updated second transfer characteristics information 115 (S124). When the HDR is indicated by second transfer characteristics information 115 (YES in S124), display controller 104A outputs control information 116 for HDR display (S125). On the other hand, when the SDR is indicated by second transfer characteristics information 115 (NO in S124), display controller 104A outputs control information 116 for SDR display (S126).

In such a manner, video reception apparatus 100A according to the present embodiment can inhibit excessively bright video from being displayed when an error occurs, by displaying video in the luminance dynamic range of the SDR when the error occurs.

Embodiment 3

The present embodiment describes the details of first transfer characteristics information 113 and processing performed using first transfer characteristics information 113. First, an example of transfer characteristics obtained by demultiplexer 102 will be described.

When the MMT is used as the multiplexing scheme, the presentation timestamp (PTS) and the decoding timestamp (DTS) of an access unit (equivalent to a picture) that comes first in the decoding order (hereinafter also referred to as a leading access unit) in a random access unit called a media processing unit (MPU) can be transmitted using a descriptor. For example, according to STD-B60 of the Association of Radio Industries and Business (ARIB), either (i) the PTS of the leading access unit of the MPU is transferred or (ii) the DTS of the leading access unit of the MPU and the DTS and the PTS of a subsequent access unit are transferred, as control information for a program, using an MPU timestamp descriptor or an MPU extended timestamp descriptor.

Figure 11:
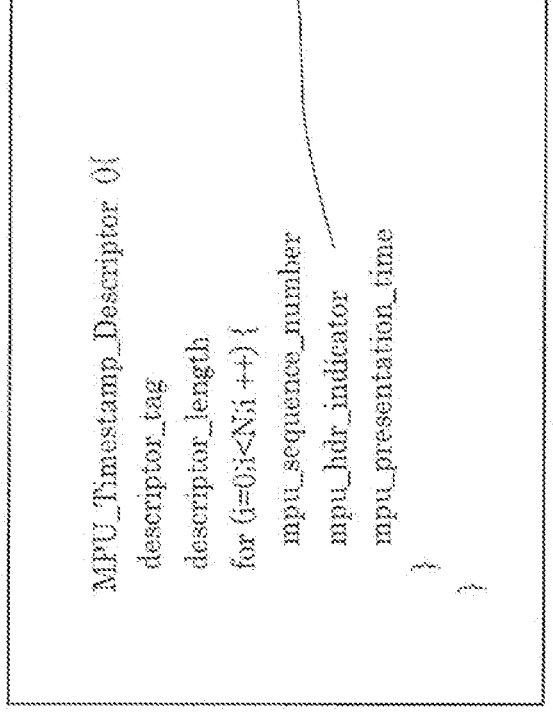
FIG. 11 illustrates an example of a timestamp descriptor according to Embodiment 3.

FIG. 11 illustrates an example of a syntax of an MPU timestamp descriptor (MPU_Timestamp_Discriptor) including HDR identification information 301. FIG. 12 illustrates an example of a syntax of an MPU extended timestamp descriptor (MPU_Extended_Timestamp_Discriptor) including HDR identification information 301.

As illustrated in FIG. 11 or FIG. 12, by extending the MPU timestamp descriptor or the MPU extended timestamp descriptor, it is possible to add, to transmission signal 212 (reception signal 111), HDR identification information 301 (mpu_hdr_indicator) indicating whether the EOTF of the access unit included in the MPU corresponds to the HDR or the SDR. Note that when there are two or more EOTFs corresponding to the HDR, e.g., when STD-B67 and SMPTE ST2084 are both available, HDR identification information 301 may include information for identifying the type of the EOTF corresponding to the HDR. Furthermore, a different descriptor may be used as long as the EOTF identification information provided per MPU can be transmitted.

When MPEG-2 TS is used as the multiplexing scheme, the PTS or the DTS of the access unit may be associated with the EOTF identification information by extending 13818-1 AMD6 (delivery of timeline for external data). Alternatively, the EOTF identification information provided per random access unit may be stored using a descriptor in the same manner as the MMT, or, the EOTF identification information provided per random access unit may be signaled using header information of the PES or the TS.

In such a manner, first transfer characteristics information 113 is included in the control information that is included in transmission signal 212 (reception signal 111). Here, the control information is provided per random access unit. Note that the random access unit is a unit including a plurality of access units (a plurality of frames) in which random access is guaranteed.

First transfer characteristics information 113 may be stored in information provided per program including a plurality of MPUs, instead of being stored as information provided per MPU such as the MPU timestamp descriptor. According to the ARIB, the resolution, aspect ratio, frame rate, etc., of a video stream are stored in a video component descriptor that is information provided per program. Thus, first transfer characteristics information 113 can also be stored in the video component descriptor. However, since information provided per program is periodically transmitted, e.g., every 0.5 seconds or every 0.1 seconds, the information cannot be updated per frame or per random access unit in some cases. Therefore, in such cases, transfer characteristics information that will be valid in the future is stored, as well as currently-valid transfer characteristics information.

FIG. 13 illustrates an example of a syntax of a video component descriptor. Current_EOTF (first information) indicates a currently-valid EOTF (transfer function), and EOTF_update_flag (second information) indicates whether the EOTF will be switched in the future. That is to say, EOTF_update_flag (second information) indicates whether or not the transfer function will be switched in the program.

When EOTF_update_flag (second information) indicates that the EOTF will be switched, the video component descriptor includes new_EOTF (third information) indicating a new EOTF to be switched to, and new_EOTF_start_mpu_sequence_number (fourth information) indicating the sequence number of the MPU in which the new EOTF will be valid. That is to say, new_EOTF_start_mpu_sequence_number (fourth information) is information for specifying a random access unit in which the EOTF will be switched.

Note that when there is one type of HDR, it is only necessary to indicate whether the EOTF corresponds to the HDR or the SDR. That is to say, the field of new_EOTF may be omitted because the new EOTF can be determined from EOTF_update_flag only.

By transmitting the transfer characteristics in the above-described manner, the video reception apparatus can obtain the transfer characteristics of the access unit included in the MPU, based only on the information about the multiplexing layer (attribute information of multiplexed AV data, and header information of a packet in which the AV data is stored). Furthermore, with the seamless connection according to the conventional ARIB, the PID of a TS packet storing a video stream or an asset ID (or a packet ID) of an MMT packet is switched when an item such as the resolution is switched. Such switching has disadvantages, e.g., it is difficult to manage a system target decoder (STD) buffer in packets having the same ID, or data supply from the transmission side temporarily stops at the switching point. These problems can be solved by adopting the present technique.

Note that the present technique is also applicable to the case of seamlessly switching a plurality of audio codecs.

The configuration of video reception apparatus 100A according to the present embodiment is different from that of Embodiment 2 in that a function is added to display controller 104A in the configuration illustrated in FIG. 9.

First, prior to decoding video signal 112, demultiplexer 102 obtains the above-described transfer characteristics (such as HDR identification information 301) from the information about the multiplexing layer, and outputs, to display controller 104A, first transfer characteristics information 113 for specifying the transfer characteristics obtained.

Since video reception apparatus 100A can obtain first transfer characteristics information 113 prior to decoding video signal 112, first transfer characteristics information 113 can be obtained before second transfer characteristics information 115 timewise. Accordingly, it is possible to extend the time between obtainment of the transfer characteristics information by display controller 104A and the actual control on video characteristics converter 106 and display device 107 by display controller 104A. Especially when the transfer characteristics are switched per access unit, an increase in the frame rate places a greater restriction on time if the transfer characteristics are obtained based on the decoding result. Therefore, it is highly beneficial to obtain the transfer characteristics from the multiplexing layer in advance.

Figure 14:
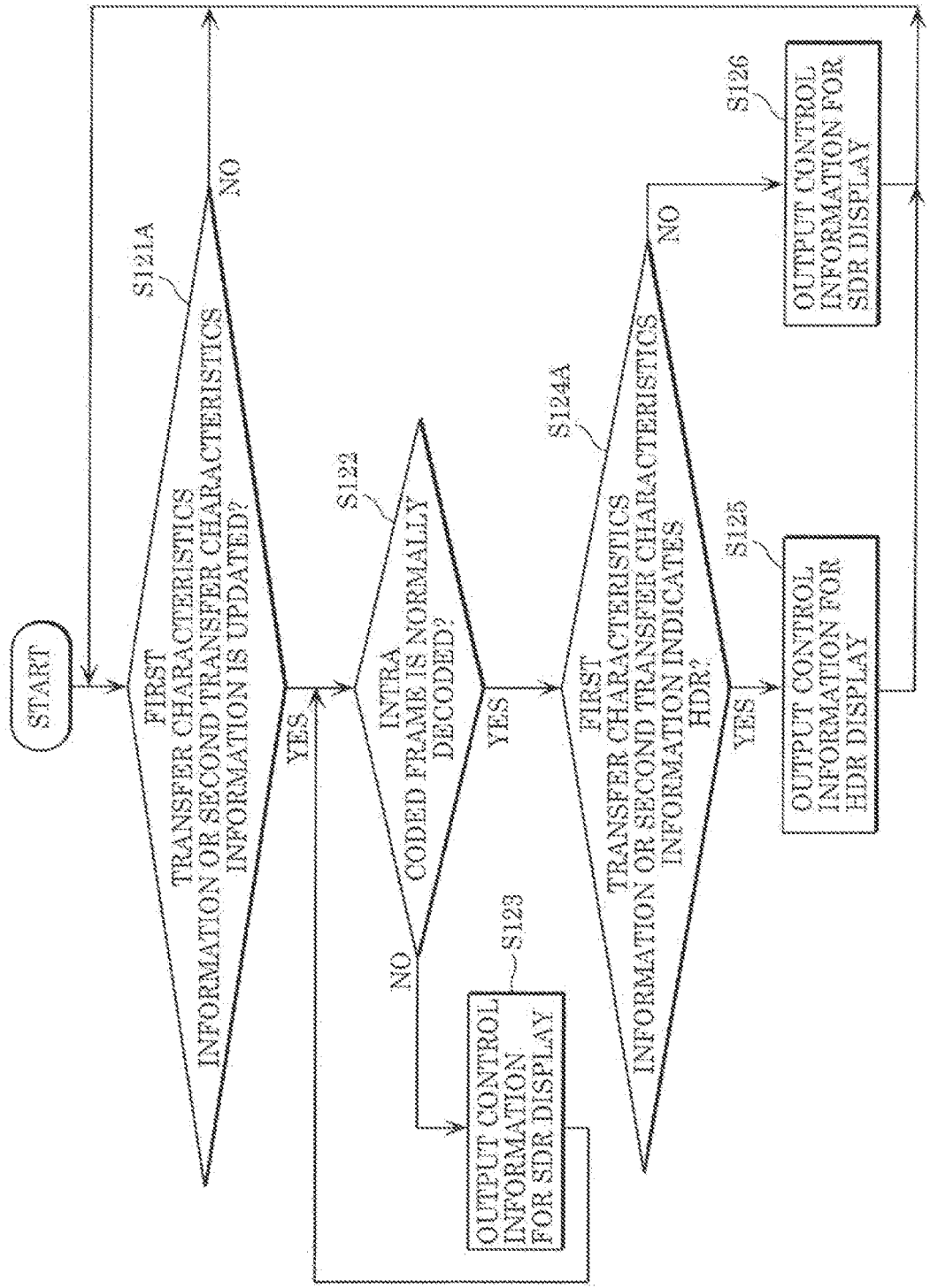
FIG. 14 illustrates a flow chart of processing performed by a display controller according to Embodiment 3.

FIG. 14 is a flow chart of display control processing performed by display controller 104A. The processing illustrated in FIG. 14 is different from the processing illustrated in FIG. 10 in terms of Steps S121A and S124A.

In Step S121A, display controller 104A determines whether first transfer characteristics information 113 is updated in addition to second transfer characteristics information 115. Furthermore, since the leading access unit of the MPU is an intra coded frame, in Step S122, display controller 104A, when operating based on first transfer characteristics information 113, operates based on (i) first transfer characteristics information 113 corresponding to the sequence number (mpu_sequence_number) of the same MPU and (ii) the result of decoding the intra coded frame. In Step S124A, display controller 104A operates based on first transfer characteristics information 113 or second transfer characteristics information 115.

Note that although FIG. 14 illustrates the example where first transfer characteristics information 113 and second transfer characteristics information 115 are both used, first transfer characteristics information 113 only may be used instead.

Figure 15:
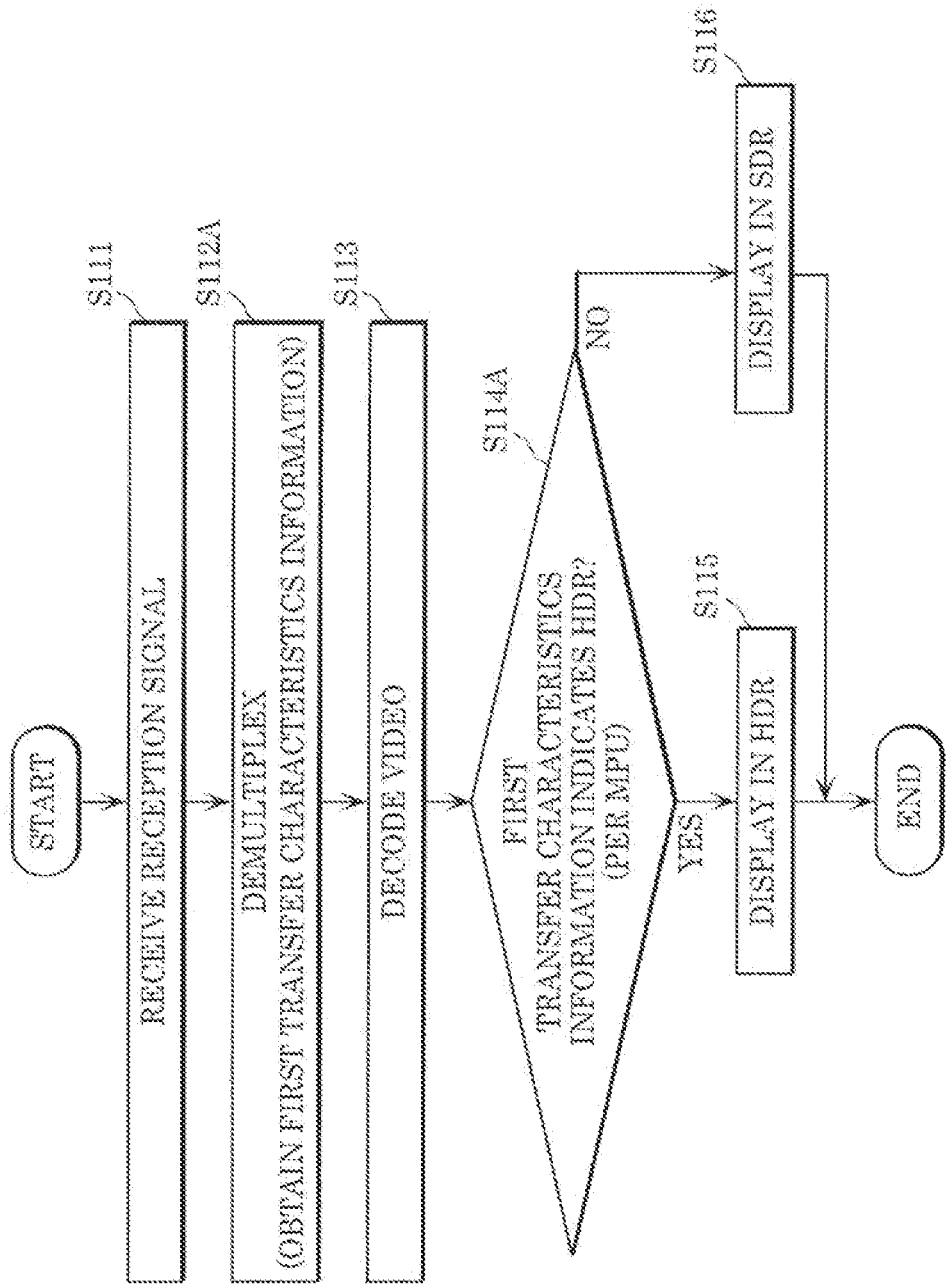
FIG. 15 illustrates a flow chart of video reception processing according to Embodiment 3.

FIG. 15 is a flow chart of video reception processing performed by video reception apparatus 100A according to the present embodiment. First, receiver 101 receives reception signal 111 (S111). Next, demultiplexer 102 generates video signal 112 and obtains first transfer characteristics information 113 by demultiplexing reception signal 111 (S112A).

Here, first transfer characteristics information 113 is information for specifying, per random access unit (per MPU), a transfer function (OETF or EOTF) corresponding to the luminance dynamic range of video data 114 (video signal 112). For example, first transfer characteristics information 113 is information for specifying, per random access unit, the first transfer function corresponding to the first luminance dynamic range (SDR) or the second transfer function corresponding to the second luminance dynamic range (HDR) wider than the first luminance dynamic range. That is to say, first transfer characteristics information 113 indicates whether video data 114 is SDR video data or HDR video data. Moreover, when there is more than one method for the HDR, first transfer characteristics information 113 may indicate the method of the HDR. That is to say, first transfer characteristics information 113 indicates the luminance dynamic range of video data 114. For example, first transfer characteristics information 113 indicates one of a plurality of predetermined luminance dynamic ranges.

Next, video decoder 103 generates video data 114 by decoding video signal 112 (S113).

Next, display controller 104A controls the luminance dynamic range of display 105 according to first transfer characteristics information 113. Specifically, display controller 104A determines, per MPU, whether data in the MPU corresponds to the HDR or the SDR, based on first transfer characteristics information 113 (S114A). When the data in the MPU corresponds to the HDR (YES in S114A), display 105 displays video in the luminance dynamic range of the HDR (S115). When the data in the MPU corresponds to the SDR (NO in S114A), display 105 displays video in the luminance dynamic range of the SDR (S116).

With the above processing, video reception apparatus 100A can control the luminance dynamic range of display 105 per random access unit, and thus can display more appropriate video. Further, since video reception apparatus 100A can obtain the transfer characteristics prior to decoding video signal 112 by using first transfer characteristics information 113 included in the multiplexing layer, it is possible to easily switch the transfer characteristics.

The configuration and operation of video transmission apparatus 200 that generates transmission signal 212 corresponding to reception signal 111 described above are generally the same as those in Embodiment 1 described above.

Specifically, in Step S202 illustrated in FIG. 7, multiplexer 204 generates transmission signal 212 including first transfer characteristics information 113.

In such a manner, video transmission apparatus 200 generates transmission signal 212 including the first transfer characteristics information for specifying the transfer function per random access unit. With this, the video reception apparatus that receives transmission signal 212 can control the luminance dynamic range of the display per random access unit, and thus can display more appropriate video. Moreover, since first transfer characteristics information 113 is included in the multiplexing layer, the video reception apparatus can easily switch the transfer characteristics.

Hereinafter, a variation of the present embodiment will be described.

In the case where a video reception apparatus such as a set top box (STB), a DVD device, or a Blu-ray (registered trademark) device receives a system stream and outputs a stream to a display device such as a TV, the video reception apparatus and the display device are connected via a communication protocol such as HDMI (registered trademark). Here, with HDMI (registered trademark) etc., protocol re-authentication occurs when the resolution or the like of the stream is switched.

Accordingly, if there is a possibility that the resolution will be switched, e.g., between 2K (e.g., 1920 pixels×1080 pixels) and 4K (e.g., 3840 pixels×2160 pixels), the video reception apparatus desirably outputs a video signal compliant with the maximum resolution when starting the reproduction. That is to say, if there is a mixture of 2K streams and 4K streams, the reception apparatus upconverts the 2K streams into 4K streams and outputs the 4K streams, even when the reproduction starts with the 2K streams. By doing so, even when a signal is switched to a 4K signal halfway through, the resolution maintains at 4K and switching of the resolution does not occur. For example, when the switching occurs between the SDR at 2K and the HDR at 4K, the video reception apparatus converts a 2K stream for the SDR into a 4K stream for the SDR, and outputs the 4K stream for the SDR.

That is to say, the video signal (video data 114) has a resolution that is a first resolution or a second resolution higher than the first resolution. When the resolution of the video signal switches between the first resolution and the second resolution, video reception apparatus 100A converts the video signal having the first resolution into the video signal having the second resolution.

In the broadcasting, identification information identifying the maximum resolution allowable in the broadcasting service is indicated by, for example, a descriptor, and thus, the video reception apparatus may operate in such a manner that the signal output to HDMI (registered trademark) has the maximum resolution constantly. For example, in the case of the ultra high definition (UHD) service, the maximum resolution is defined as 4K or 8K. When the multiplexing scheme is the TS, the maximum resolution is defined as 2K, whereas when the multiplexing scheme is the MMT, the maximum resolution is defined as 4K. Accordingly, the video reception apparatus may constantly convert the video signal into a video signal having the maximum resolution supporting the multiplexing scheme, and output the video signal having the maximum resolution.

That is to say, when the resolution of the video signal (video data 114) is lower than the maximum resolution defined by the broadcasting service for reception signal 111, video reception apparatus 100A converts the resolution of the video signal into the maximum resolution.

Embodiment 4

In the present embodiment, the signal level of the video signal is limited when the luminance dynamic range is switched between the SDR and the HDR. This enables easier switching of the luminance dynamic range by the video reception apparatus.

First, interchangeable characteristics of STD-B67 corresponding to the HDR will be described. In terms of device design, it is important to allow a certain length of delay from when the transfer characteristics are obtained to when video characteristics converter 106 and display device 107 are controlled. As an example where such a delay is allowed, it has been described earlier that the switching of the transfer characteristics is notified in advance using a descriptor in a multiplexing layer.

However, even when the switching of the transfer characteristics is notified in advance, it is necessary to control video characteristics converter 106 and display device 107 in synchronization with a frame that switches from the SDR to the HDR or from the HDR to the SDR.

Meanwhile, when the luminance value of the SDR (BT.2020, for example) at the electric signal level of 1.0 is adjusted to a level on the order of 400% to 500% with respect to 1200% for STD-B67 (HDR), the shape of a curve showing a relationship between the electric signal level and the luminance of STD-B67 generally matches the shape of a curve for the SDR at low luminance.

Figure 16:
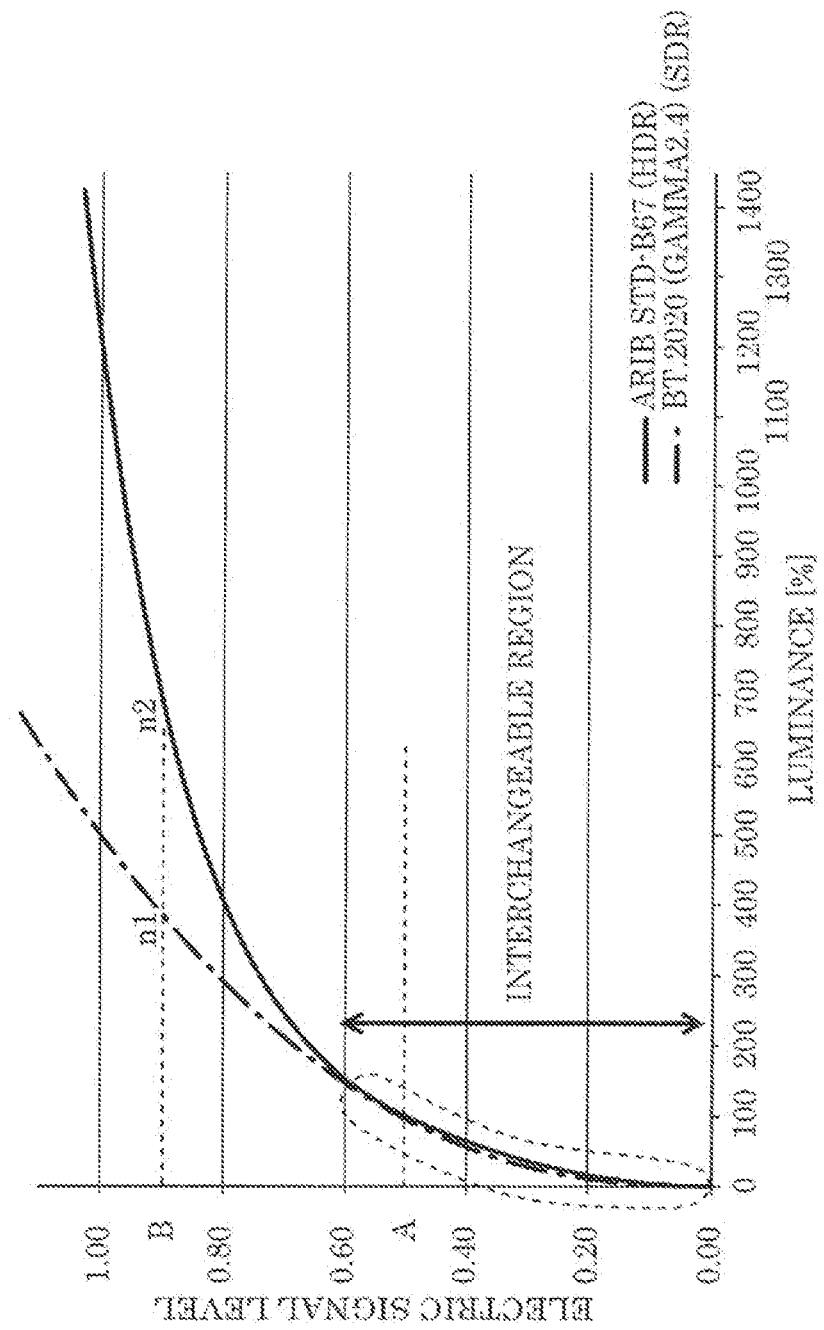
FIG. 16 illustrates an example of a curve showing a relationship between the electric signal level and the luminance of the HDR and a curve showing a relationship between the electric signal level and the luminance of the SDR according to Embodiment 4.

FIG. 16 illustrates an example of a curve showing a relationship between the electric signal level and the luminance of the HDR (STD-B67) and a curve showing a relationship between the electric signal level and the luminance of the SDR (BT.2020) according to Embodiment 4. As illustrated in FIG. 16, the HDR curve and the SDR curve generally match each other in the low luminance range. Thus, if the luminance range of the HDR video data converted by STD-B67 is equivalent to the luminance range in which the shapes of the above-described curves generally match, even a display device that supports only the SDR can reproduce video that does not give the viewer a feeling of visual strangeness. That is to say, STD-B67 has the characteristics of interchangeability between the SDR and the HDR (interchangeable characteristics). Hereinafter, a range of the electric signal level corresponding to the luminance range in which the shape of the SDR curve and the shape of the HDR (STD-B67) curve generally match each other is referred to as an interchangeable region. In other words, as illustrated in FIG. 16, the interchangeable region is a predetermined range of the electric signal level, and is a range of the electric signal level lower than a predetermined limit value.

For example, in FIG. 16, electric signal level A is within the interchangeable region, and thus STD-B67 and BT.2020 are equivalent in the luminance value. On the other hand, the luminance value corresponding to electric signal level B is n1 for BT.2020 and n2 for STD-B67, which are significantly different from each other. This results in a problem that at the time of switching from the HDR to the SDR, when, for example, there is a delay in the switching of the transfer characteristics by the video reception apparatus and SDR pixels outside the interchangeable region are thus reproduced as HDR pixels in error, the pixels are reproduced at an improperly high luminance value.

Hereinafter, a method for providing a transition period in the switching of the transfer characteristics according to the present embodiment will be described. By making use of the above-described interchangeable characteristics, it is possible to display video that does not give the viewer a feeling of strangeness even when the video reception apparatus does not switch the transfer characteristics in synchronization with the frame.

First, with reference to FIG. 17, an operation performed for switching from an SDR program to an HDR program will be described. A certain time period at the end of the SDR program is set as a period of transition from the SDR to the HDR (a transition period). In the transition period, video data is generated using the electric signal level within the interchangeable region. By doing so, regardless of whether the control settings for the SDR display are used or the control settings for the HDR display are used in the transition period, video having a visually equivalent luminance is reproduced. It is thus possible to inhibit reproduction of video at an improperly high luminance in error.

The switching of the transfer characteristics can be notified using the information included in the multiplexing layer such as the video component descriptor illustrated in FIG. 11 to FIG. 13. Here, given that the transition period is T second(s) and a length of time allowed for the switching of the transfer characteristics by the video reception apparatus (a switching allowed time) is S second(s), a descriptor that notifies the switching of the transfer characteristics is transmitted in a period of (T-S) second(s) from the start of the transition period. By switching the display control within S second(s) from obtainment of the descriptor, the video reception apparatus can complete the switching of the display control before the HDR program starts.

In such a manner, by providing the transition period and restricting the highest luminance of the image in the transition period, and notifying the switching of the transfer characteristics using the multiplexing layer, the video reception apparatus can switch the display control based only on the information included in the multiplexing layer without having to analyze the video stream (video signal 112).

Note that the transition period may be notified as information for the video stream such as an SEI message, even though analysis of the video stream is required.

Next, an operation performed for switching from an HDR program to an SDR program will be described. In this case, too, the transition period can be provided in the same manner as in the operation performed for switching from an SDR program to an HDR program described above.

Figure 18:
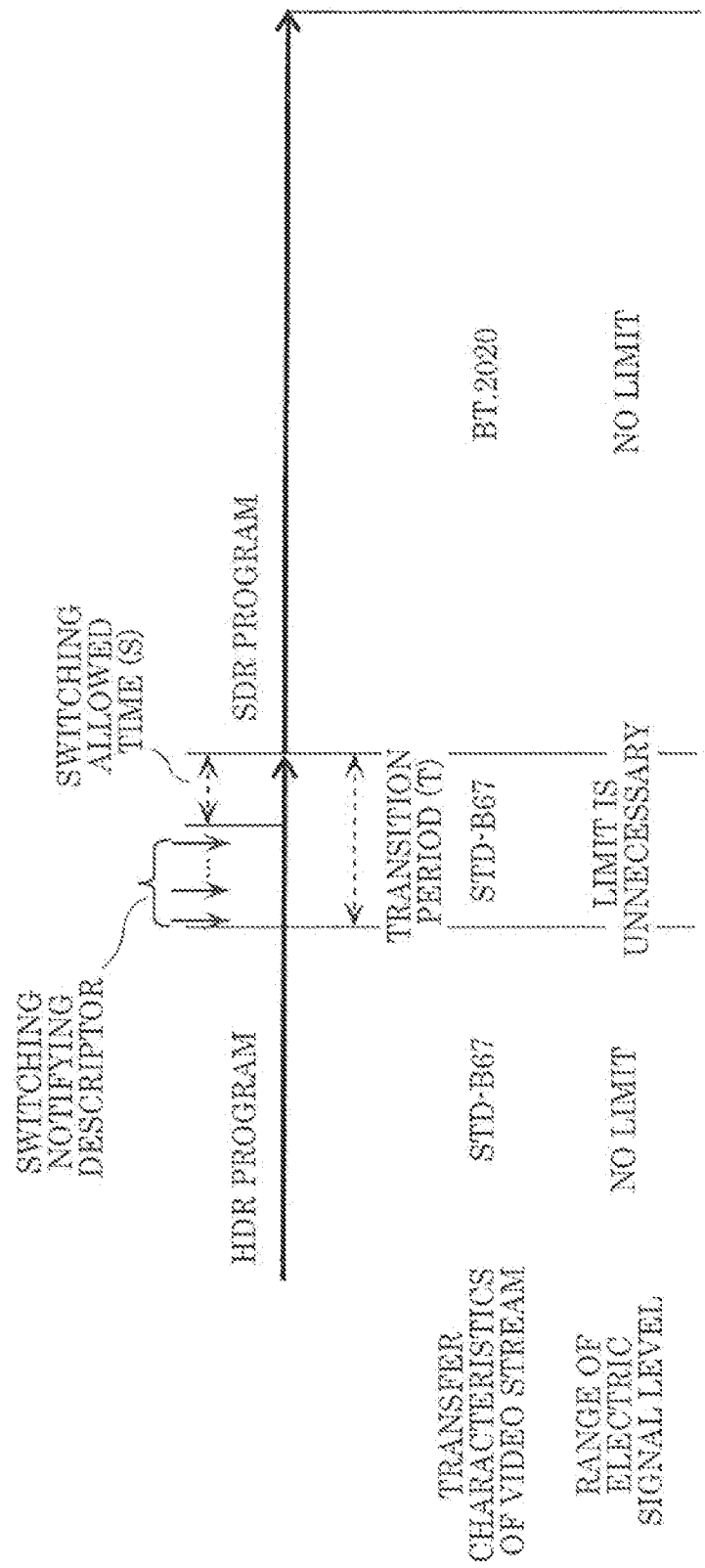
FIG. 18 illustrates an operation performed for switching from the HDR to the SDR according to Embodiment 4.

Here, when HDR pixels outside the interchangeable luminance range are reproduced as SDR pixels, the pixels are reproduced at a luminance value lower than the actual luminance value. Therefore, such reproduction in this case is less likely to adversely affect the viewer in terms of health etc. As such, as illustrated in FIG. 18, for the switching from an HDR program to an SDR program, the range of the electric signal level need not be limited to the interchangeable region in the transition period.

Note that the above-described interchangeable region is a predetermined range of the electric signal level, and is a range of the electric signal level lower than a predetermined limit value. For example, BBC Research & Development White Paper WHP 283, July 2014 (NPL 2) describes the characteristics of these SDR and HDR curves (p. 9, FIG. 3, for example). That is to say, the lower limit value of the interchangeable region is the electric signal level of 0, that is, black.

Figure 19:
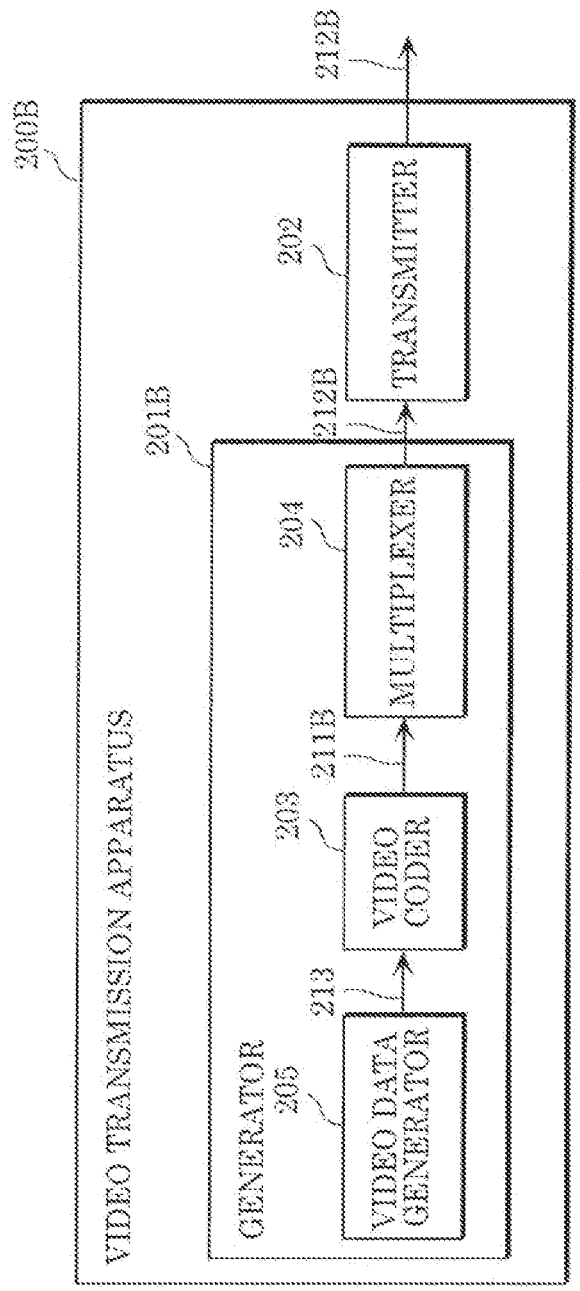
FIG. 19 is a block diagram of a video transmission apparatus according to Embodiment 4.

Hereinafter, a video transmission apparatus and a video reception apparatus that implement the above function will be described. FIG. 19 is a block diagram of video transmission apparatus 200B according to the present embodiment. Video transmission apparatus 200B includes generator 201B and transmitter 202. Generator 201B generates transmission signal 212B including, in a time series, first video data having a first luminance dynamic range (SDR) and second video data having a second luminance dynamic range (HDR) wider than the first luminance dynamic range (SDR). Generator 201B includes video data generator 205, video coder 203, and multiplexer 204. Transmitter 202 transmits transmission signal 212B.

Figure 20:
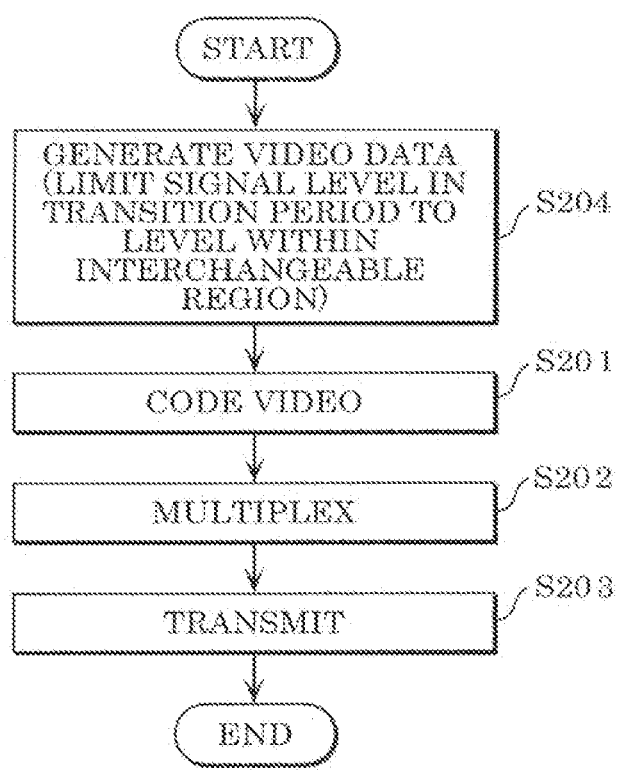
FIG. 20 illustrates a flow chart of video transmission processing according to Embodiment 4.

FIG. 20 is a flow chart of video transmission processing performed by video transmission apparatus 200B. First, video data generator 205 generates video data 213 (S204). At this time, video data generator 205, as described above, limits the signal level corresponding to the luminance value to a level within the interchangeable region in the transition period provided for switching from one of the first video data and the second video data to the other. That is to say, video data generator 205 limits the signal level to a value lower than a predetermined limit value. The transition period is a period immediately before the switching time, for example.

Furthermore, as described above, the signal level is limited only when the luminance dynamic range is switched from the SDR and the HDR, and the signal level need not be limited when the luminance dynamic range is switched from the HDR to the SDR. That is to say, the signal level corresponding to the luminance value may be limited to a value lower than the limit value in a first transition period provided for switching from the first video data (SDR) to the second video data (HDR), whereas the signal level corresponding to the luminance value need not be limited to a value lower than the limit value in a second transition period provided for switching from the second video data (HDR) to the first video data (SDR).

Next, video coder 203 generates video signal 211B by coding video data 213 (S201). Next, multiplexer 204 generates transmission signal 212B by multiplexing video signal 211B generated and an audio signal (S202). Then, transmitter 202 transmits transmission signal 212B (S203).

Figure 17:
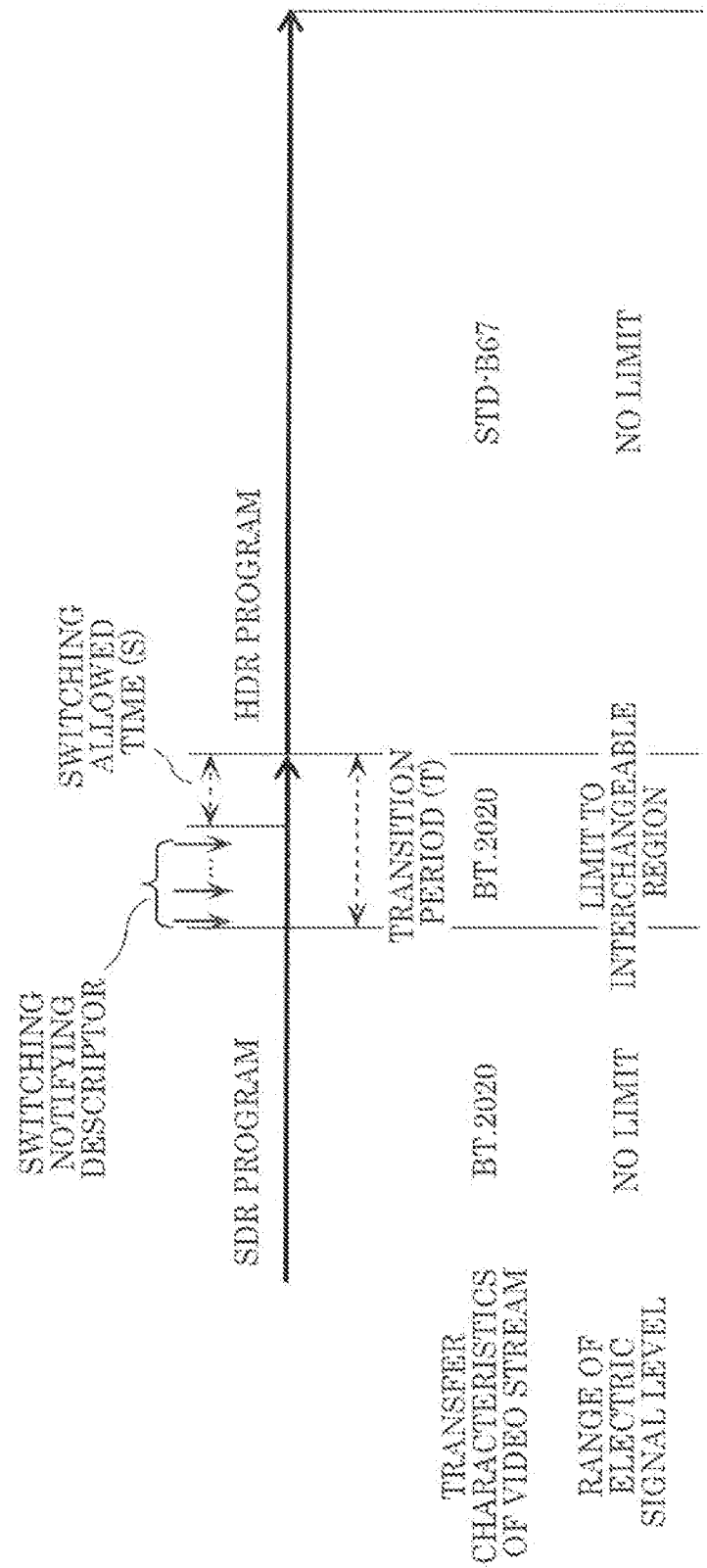
FIG. 17 illustrates an operation performed for switching from the SDR to the HDR according to Embodiment 4.

As illustrated in FIG. 17 and FIG. 18, transmission signal 212B includes first information (a switching notifying descriptor) for notifying the switching of the luminance dynamic range in a first period immediately after the start of the transition period. For example, the first period is a period of time from immediately after the start of the transition period to a time preceding a switching time by a switching allowed time that is a length of time allowed for the switching of the luminance dynamic range by the video reception apparatus that receives transmission signal 212B.

The first information (the switching notifying descriptor) is transmitted using the multiplexing layer. That is to say, multiplexer 204 generates transmission signal 212B including the first information (the switching notifying descriptor) by multiplexing video signal 211B and an audio signal. Transmission signal 212B may include second information indicating the transition period.

Figure 21:
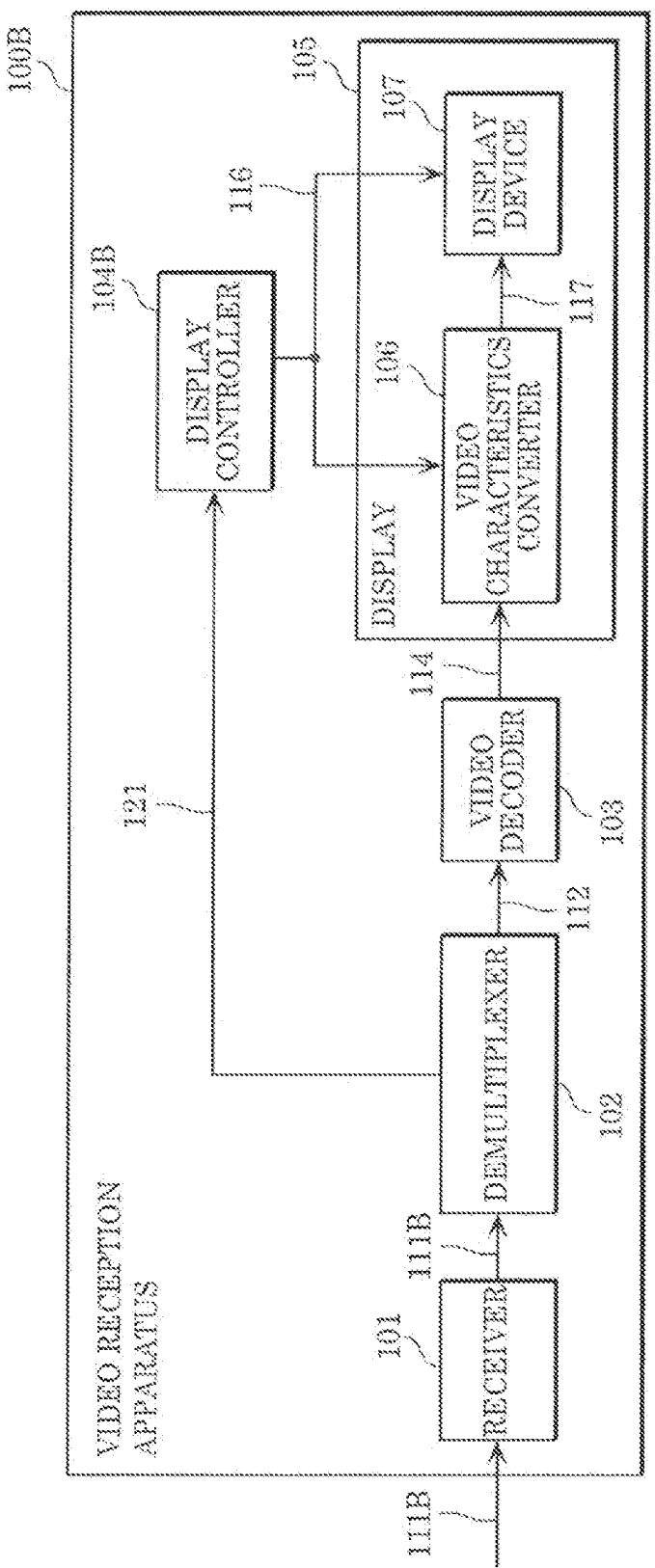
FIG. 21 is a block diagram of a video reception apparatus according to Embodiment 4.

FIG. 21 is a block diagram of video reception apparatus 100B according to the present embodiment. Video reception apparatus 100B receives reception signal 111B that is transmission signal 212B generated by video transmission apparatus 200B illustrated in FIG. 19. Note that the basic configuration is the same as that of video reception apparatus 100 illustrated in FIG. 1, but the function of display controller 104B is different from that of display controller 104.

Figure 22:
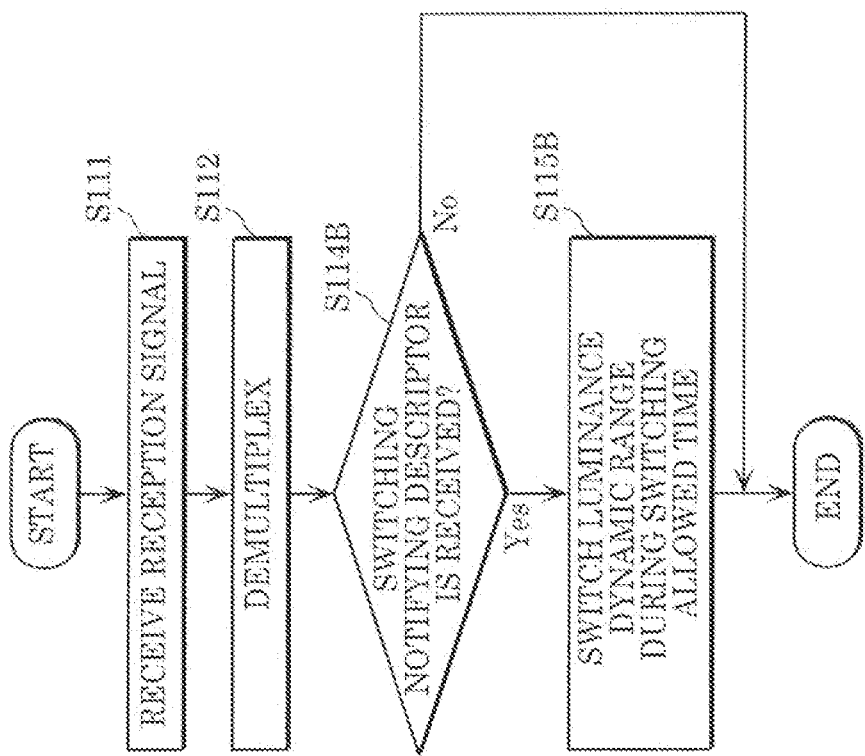
FIG. 22 illustrates a flow chart of video reception processing according to Embodiment 4.

FIG. 22 is a flow chart of video reception processing performed by video reception apparatus 100B. First, receiver 101 receives reception signal 111B including, in a time series, first video data having a first luminance dynamic range (SDR) and second video data having a second luminance dynamic range (HDR) wider than the first luminance dynamic range (SDR) (S111). Here, as described above, in reception signal 111B, the signal level corresponding to the luminance value is limited to a value lower than a predetermined limit value in the transition period provided for switching from one of the first video data and the second video data to the other.

Next, demultiplexer 102 obtains video signal 112 by demultiplexing reception signal 111B that is multiplexed from a video signal and an audio signal (S112). The multiplexing layer includes switching notifying descriptor 121 (the first information), and demultiplexer 102 obtains switching notifying descriptor 121. Here, switching notifying descriptor 121 is information for notifying the switching of the luminance dynamic range in the first period immediately after the start of the transition period.

When switching notifying descriptor 121 is received (YES in S114B), display controller 104B switches the luminance dynamic range of display 105 during the switching allowed time that starts when switching notifying descriptor 121 is obtained (S115B). Here, the switching allowed time is a length of time allowed for the switching of the luminance dynamic range.

Note that although not illustrated, video decoder 103 obtains video data 114 by decoding video signal 112 in parallel with the processing in Steps S114B and S115B. Display 105 displays video data 114 in the currently-set luminance dynamic range.

As described above, in the present embodiment, the signal level of video data is limited to a value lower than the limit value in the transition period provided for switching to video data having a different luminance dynamic range. With this, the video reception apparatus need not change the luminance dynamic range of the display on a per-frame basis, for example, and it is only necessary to change the luminance dynamic range of the display in the transition period. Thus, the video reception apparatus can easily control the switching of the luminance dynamic range.

Hereinbefore, the video reception apparatus and the video transmission apparatus according to embodiments of the present disclosure have been described; however, the present disclosure is not limited to these embodiments.

Moreover, each of processing members included in the video reception apparatus and the video transmission apparatus according to the above embodiments are typically implemented as LSI which is an integrated circuit. These may be implemented in a single chip individually, or in a single chip that includes some or all of them.

Moreover, the method of circuit integration is not limited to LSI. Integration may be implemented with a specialized circuit or a general purpose processor. It is also acceptable to use: a field programmable gate array (FPGA) that is programmable after the LSI is manufactured; and a reconfigurable processor that allows reconfiguration of the connections and settings of the inner circuit cells of the LSI circuit.

Further, in each embodiment described above, each structural element may be implemented by dedicated hardware or by execution of a software program appropriate for the structural element. Each structural element may also be implemented by reading and execution, by a program executing unit such as a central processing unit (CPU) or a processor, of a software program recorded on a recording medium such as a hard disk or semiconductor memory.

Furthermore, the present disclosure may be implemented as a video reception method performed by a video reception apparatus or as a video transmission method performed by a video transmission apparatus.

The division of the functional blocks in the block diagrams is a mere example. A plurality of functional blocks may be implemented as one functional block, or one functional block may be divided into a plurality of blocks, or a part of the functions may be transferred to another functional block. Moreover, the functions of a plurality of functional blocks having similar functions may be performed by single hardware or software in parallel or by time division.

Furthermore, since the processing order of the steps in each flow chart is one example given for specifically describing the present disclosure, other processing orders may be adopted. In addition, a part of the steps may be performed simultaneously (in parallel) with another step.

Hereinbefore, a video reception apparatus and a video transmission apparatus according to one or more aspects have been described based on embodiments; however, the present disclosure is not limited to these embodiments. Various modifications to these embodiments that are conceivable to those skilled in the art, as well as embodiments resulting from combinations of structural elements of different embodiments may be included within the scope of one or more aspects, as long as such modifications and embodiments do not depart from the essence of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a video reception apparatus such as a TV, and a video transmission apparatus.

What is claimed is:

1. A video transmission method comprising:
generating a transmission signal including, in a time series, a first video having a first luminance dynamic range and a second video having a second luminance dynamic range wider than the first luminance dynamic range, the first video and the second video being to be decoded according to first transfer characteristics and second transfer characteristics, respectively; and
transmitting the transmission signal generated, wherein
a first signal level of the first video converted according to the first transfer characteristics is substantially the same as a second signal level of the second video converted according to the second transfer characteristics in a transition period in which a played video is switched from one of the first video and the second video to the other of the first video and the second video.

2. A video reception method comprising:
receiving a reception signal including, in a time series, a first video having a first luminance dynamic range and a second video having a second luminance dynamic range wider than the first luminance dynamic range; and
decoding the first video and the second video according to first transfer characteristics and second transfer characteristics, respectively, wherein
a first signal level of the first video converted according to the first transfer characteristics is substantially the same as a second signal level of the second video converted according to the second transfer characteristics in a transition period in which a played video is switched from one of the first video and the second video to the other of the first video and the second video.

3. A video reception apparatus comprising:
a receiver that receives a reception signal including, in a time series, a first video having a first luminance dynamic range and a second video having a second luminance dynamic range wider than the first luminance dynamic range; and
a decoder that decodes the first video and the second video according to first transfer characteristics and second transfer characteristics, respectively, wherein
a first signal level of the first video converted according to the first transfer characteristics is substantially the same as a second signal level of the second video converted according to the second transfer characteristics in a transition period in which a played video is switched from one of the first video and the second video to the other of the first video and the second video.

* * * * *